US011663492B2

(12) United States Patent
Hodjat et al.

(10) Patent No.: US 11,663,492 B2
(45) Date of Patent: May 30, 2023

(54) ALIFE MACHINE LEARNING SYSTEM AND METHOD

(71) Applicant: Cognizant Technology Solutions U.S. Corporation, College Station, TX (US)

(72) Inventors: Babak Hodjat, Dublin, CA (US); Hormoz Shahrzad, Dublin, CA (US)

(73) Assignee: Cognizant Technology Solutions, College Station, TX (US)

( * ) Notice: Subject to any disclaimer, the term of this patent is extended or adjusted under 35 U.S.C. 154(b) by 1122 days.

(21) Appl. No.: 15/851,294

(22) Filed: Dec. 21, 2017

(65) Prior Publication Data
US 2018/0114118 A1 Apr. 26, 2018

Related U.S. Application Data

(63) Continuation-in-part of application No. PCT/IB2016/001060, filed on Jun. 27, 2016.
(Continued)

(51) Int. Cl.
*G06N 3/12* (2023.01)
*G06N 20/00* (2019.01)
(Continued)

(52) U.S. Cl.
CPC ......... *G06N 3/126* (2013.01); *G06F 9/45516* (2013.01); *G06F 16/00* (2019.01);
(Continued)

(58) Field of Classification Search
CPC combination set(s) only.
See application file for complete search history.

(56) References Cited

U.S. PATENT DOCUMENTS 5,845,266 A   12/1998  Lupien et al.
5,920,848 A    7/1999  Schutzer et al.
(Continued)

FOREIGN PATENT DOCUMENTS

EP    242278     2/2012
EP   2422276     2/2012
(Continued)

OTHER PUBLICATIONS

O'Reilly et al., "EC-Star: A Massive-Scale, Hub and Spoke, Distributed Genetic Programming System", In: Riolo et al, Genetic Programming Theory and Practice X, Apr. 19, 2013, Genetic and Evolutionary Computation, pp. 73-85 (Year: 2013).*
(Continued)

*Primary Examiner* — Kamran Afshar
*Assistant Examiner* — Ryan C Vaughn
(74) *Attorney, Agent, or Firm* — Dawn-Marie Bey; Bey & Cotropia PLLC

(57) ABSTRACT

Roughly described, a problem solving platform distributes the solving of the problem over a evolvable individuals, each of which also evolves its own pool of actors. The actors have the ability to contribute collaboratively to a solution at the level of the individual, instead of each actor being a candidate for the full solution. Populations evolve both at the level of the individual and at the level of actors within an individual. In an embodiment, an individual defines parameters according to which its population of actors can evolve. The individual is fixed prior to deployment to a production environment, but its actors can continue to evolve and adapt while operating in the production environment. Thus a goal of the evolutionary process at the level of individuals is to find populations of actors that can sustain themselves and survive, solving a dynamic problem for a given domain as a consequence.

11 Claims, 12 Drawing Sheets

Related U.S. Application Data

(60) Provisional application No. 62/184,803, filed on Jun. 25, 2015.

(51) Int. Cl.
  G06F 16/00 (2019.01)
  G06F 16/2458 (2019.01)
  G06F 9/455 (2018.01)
  G06N 3/126 (2023.01)

(52) U.S. Cl.
  CPC ......... G06F 16/2465 (2019.01); G06N 20/00 (2019.01); *G06F 2216/03* (2013.01)

(56) References Cited

U.S. PATENT DOCUMENTS

| | | | | |
|---|---|---|---|---|
| 5,930,780 | A | * | 7/1999 | Hughes .................. H04L 67/34 706/13 |
| 6,240,399 | B1 | | 5/2001 | Frank et al. |
| 6,249,783 | B1 | | 6/2001 | Crone et al. |
| 7,013,344 | B2 | | 3/2006 | Megiddo |
| 7,370,013 | B1 | | 5/2008 | Aziz et al. |
| 7,444,309 | B2 | | 10/2008 | Branke et al. |
| 8,527,433 | B2 | | 9/2013 | Hodjat et al. |
| 8,909,570 | B1 | | 12/2014 | Hodjat et al. |
| 8,918,349 | B2 | | 12/2014 | Hodjat et al. |
| 9,256,837 | B1 | * | 2/2016 | Hodjat ................. G06N 3/126 |
| 9,304,895 | B1 | * | 4/2016 | Shahrzad ............ G06F 11/3692 |
| 9,367,816 | B1 | * | 6/2016 | Demaneuf .......... G06F 16/2465 |
| 9,446,512 | B1 | * | 9/2016 | Moses ................. G06N 3/126 |
| 9,466,023 | B1 | * | 10/2016 | Shahrzad ............. G06N 3/126 |
| 9,684,875 | B1 | | 6/2017 | Hodjat et al. |
| 9,734,215 | B2 | | 8/2017 | Hodjat et al. |
| 2002/0019844 | A1 | | 2/2002 | Kurowski et al. |
| 2003/0158887 | A1 | | 8/2003 | Megiddo |
| 2003/0177105 | A1 | * | 9/2003 | Xiao ..................... G06N 3/126 706/13 |
| 2004/0210545 | A1 | | 10/2004 | Branke et al. |
| 2004/0254901 | A1 | | 12/2004 | Bonabeau et al. |
| 2005/0033672 | A1 | | 2/2005 | Lasry et al. |
| 2005/0187848 | A1 | | 8/2005 | Bonissone et al. |
| 2005/0198103 | A1 | | 9/2005 | Ching |
| 2007/0100907 | A1 | | 5/2007 | Bayer |
| 2007/0143198 | A1 | | 6/2007 | Brandes et al. |
| 2007/0143759 | A1 | | 6/2007 | Ozgur et al. |
| 2007/0185990 | A1 | | 8/2007 | Ono et al. |
| 2008/0071588 | A1 | | 3/2008 | Eder |
| 2008/0228644 | A1 | | 9/2008 | Birkestrand et al. |
| 2009/0125370 | A1 | | 5/2009 | Blondeau et al. |
| 2009/0307638 | A1 | | 12/2009 | McConaghy |
| 2010/0030720 | A1 | | 2/2010 | Stephens |
| 2010/0182935 | A1 | | 7/2010 | David |
| 2010/0274736 | A1 | | 10/2010 | Hodjat et al. |
| 2010/0274742 | A1 | | 10/2010 | Hodjat et al. |
| 2010/0293119 | A1 | * | 11/2010 | Ferringer ................ G06N 3/126 712/31 |
| 2011/0161264 | A1 | | 6/2011 | Cantin |
| 2012/0239517 | A1 | | 9/2012 | Blondeau et al. |
| 2013/0124440 | A1 | * | 5/2013 | Hodjat ................... G06N 3/126 706/13 |
| 2013/0254142 | A1 | | 9/2013 | Hodjat et al. |
| 2014/0006316 | A1 | | 1/2014 | Hodjat et al. |
| 2017/0060963 | A1 | | 3/2017 | Whittaker et al. |
| 2017/0323219 | A1 | | 11/2017 | Shahrzad et al. |

FOREIGN PATENT DOCUMENTS

| | | |
|---|---|---|
| JP | 08-110804 | 4/1996 |
| JP | 2001325041 | 11/2001 |
| JP | 2003044665 | 2/2003 |
| JP | 2004240671 | 8/2004 |
| JP | 2004302741 | 10/2004 |
| JP | 2007207173 | 8/2007 |
| JP | 2007522547 | 8/2007 |
| WO | WO 2005/073854 | 8/2005 |
| WO | WO2010/127039 | 11/2010 |
| WO | WO 2010/127042 | 11/2010 |
| WO | 2016207731 A2 | 12/2016 |

OTHER PUBLICATIONS

Hodjat et al., "Introducing an Age-Varying Fitness Estimation Function", In: Riolo et al, Genetic Programming Theory and Practice X , Apr. 19, 2013, Genetic and Evolutionary Computation, pp. 59-71 (Year: 2013).*
Merelo-Guervós et al. "Pool-Based Distributed Evolutionary Algorithms Using an Object Database", In: Di Chio C. et al., Applications of Evolutionary Computation, EvoApplications 2012, Lecture Notes in Computer Science, vol. 7248, pp. 446-455 (Year: 2012).*
Hodjat et al., "Maintenance of a Long Running Distributed Genetic Programming System for Solving Problems Requiring Big Data", In: Riolo et al., Genetic Programming Theory and Practice XI, Mar. 10, 2014, Genetic and Evolutionary Computation, pp. 65-83 (Year: 2014).*
International Search Report and Written Opinion for PCT Application No. PCT/US18/66610, dated Apr. 15, 2019, 8 pp.
U.S. Appl. No. 13/358,381—Office Action dated Jul. 8, 2014, 30 pp.
Freitas, A., "A review of evolutionary algorithms for data mining," Soft Computing for Knowledge Discovery and Data Mining, Springer US, 2008 pp. 79-111.
U.S. Appl. No. 13/540,507—Office Action dated Sep. 9, 2014, 25 pp.
Bongard, J. C. et al., "Guarding Against Premature Convergence while Accelerating Evolutionary Search", GECCO'10: Proceedings of the 12th annual conference on Genetic and Evolutionary Computation, 8 pages (2010).
Hornby, Gregory S.; "The Age-Layered Population Structure (ALPS) Evolutionary Algorithm"; 2009; ACM; GECCO '09; 7 pages.
Gaspar-Cunha, A. et al., "A Multi-Objective Evolutionary Algorithm Using Neural Networks to Approximate Fitness Evaluations," Int'l J. Computers, Systems and Signals, 6(1) 2005, pp. 18-36.
Kosorukoff, A. "Using incremental evaluation and adaptive choice of operators in a genetic algorithm," Proc. Genetic and Evolutionary Computation Conference, GECCO—Sep. 2002, 7pp.
Nelson, A. "Fitness functions in evolutionary robotics; A survey and analysis," Robotics and Autonomous Systems 57 (Apr. 30, 2009) 345-370.
Wu, A.S. et al., "An incremental fitness function for partitioning parallel taks," Proc. Genetic and Evolutionary Computation Conf. (Aug. 2001) 8pp.
Whitehead, B.A. "Genetic Evolution of Radial Basis Function Coverage Using Orthogonal Niches," IEEE Transactions on Neural Networks, 7:6, (Nov. 1996) 1525-28.
Bui L.T. et al., "Local models: An approach to distributed muiti-objective optimization," Computational Optimization and Applications, vol. 42, No. 1, Oct. 2007, pp. 105-139.
Castillo Tapia M.G. et al., "Applications of muiti-objective evolutionary algorithms in economics and finance: A survey," Proc. IEEE Congress on Evolutionary Computation, Sep. 2007, pp. 532-539.
Ducheyne, E. et al., "Is Fitness Inheritance Useful for Real-World Applications?" Evolutionary Multi-Criterion Optimization, ser. LNCS 2631, Spring 2003, pp. 31-42.
Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.
Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.
Juille, H. "Evolution of Non-Deterministic Incremental Algorithms as a New Approach for Search in State Spaces," Proc. 6th Int'l Conf. on Genetic Algorithms, 1995, 8pp.
International Search Report dated Jul. 2, 2010 in PCT/US10/32847 (GNFN 2510-2).
International Search Report dated Jun. 29, 2010 in PCT/US10/32841.

(56) References Cited

OTHER PUBLICATIONS

Sacks, J. et al. "Design and Analysis of Computer Experiments," Statistical Science 4:4, 1989, 409-435.
Torresen, J. "A Dynamic Fitness Function Applied to Improve the Generalisation when Evolving a Signal Processing Hardware Architecture," Proc. EvoWorkshops 2002, 267-299 (12 pp).
Bartlett II, J.E. et al., "Organizational Research: Determining Appropriate Sample Size in Survey Research," IT, Learning, and Performance Journal 19(1) Spring 2001, 8pp.
Fitzpatrick, J.M. et al., "Genetic Algorithms in Noisy Environments," Machine Learning 3: 101-120, May 1988.
JP 2010-533295, Office Action dated Apr. 16, 2013, 3 pp.
León C. et al., "Parallel hypervolume-guided hyperheuristic for adapting the muiti-objective evolutionary island model," Proc. 3rd Int'l Workshop on Nature Inspired Cooperative Strategies for Optimization Studies in Computational Intelligence, vol. 236, Nov. 2008, pp. 261-272.
Leópez Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.
Davarynejad, M. et al., "A Novel General Framework for Evolutionary Optimization: Adaptive Fuzzy Fitness Granulation," CEO Sep. 2007, 6pp.
Davarynejad, M. "Fuzzy Fitness Granulation in Evolutionary Algorithms for complex optimization," Master of Science Thesis, Ferdowsi Univ. of Mashhad, Jun. 2007, 30pp.
Salami, M. et al., "A fast evaluation strategy for evolutionary algorithms," Applied Soft Computing 2/3F (Jan. 2003) 156-173.
M.-R Akbarzadeh-T. et al., "Friendship Modeling for Cooperative Co-Evolutionary Fuzzy Systems: A Hybrid GA-GP Algorithm," Proc. 22nd Int'l Conf. of N American FIPS, Jul. 2003, pp. 61-66.
Mouret, J.B. et al., "Encouraging Behavioral Diversity in Evolutionary Robotics: An Empirical Study," MIT, Evolutionary Computation 20(1):91-133, 2012.
Myers, Raymond H. and MONTGOMERY, Douglas C., Response Surface Methodology: Process and Product Optimization Using Designed Experiments, John Wiley and Sons, Inc., New York, 1995.
Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.
Georgilakis, P.S. "Genetic Algorithm Model for Profit Maximization of Generating Companies in Deregulated Electricity Markets," Applied Artificial Intelligence, Jul. 2009, 23:6,538-552.
Refaeilzadeh, P. et al., "Cross Validation" entry, Encyclopedia of Database Systems, eds. Özsu and Liu, Springer, 2009, 6pp.
Remde, S et al. "Evolution of Fitness Functions to Improve Heuristic Performance," Lion Dec. 8-10, 2007 II, LNCS 5313 pp. 206-219.
Sakauchi et al., Unifine: A Next Generation Financial Solution System of Nihon Unisys Ltd., Technology Review 'Unisys,' Japan, Nihon Unisys Ltd., Feb. 28, 2006, vol. 25, No. 4, pp. 14-15.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the internet: URL: http://www.ra.cs.uni-tuebingen.de/mita rb/streiche/publications/introduction to E volutionary Algorithms.pdf).
Laumanns, Marco et al.; "A Unified Model for Multi-Objective Evolutionary Algorithms with Elitism"; 2000: IEEE; pp. 46-53.
Ahn, Chang Wook et al.; "Elitism-Based Compact Genetic Algorithms"; 2003; IEEE; Transactions on Evolutionary Computation, vol. 7, No. 4; pp. 367-385.
Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.
Hornby, G.S., "A Steady-State Version of the Age-Layered Population Structure EA," Chapter 1 of Genetic Programming Theory and Practice VII, Riolo et al., editors, Springer 2009, 16pp.
Hornby, G.S., "Steady-State ALPS for Real-Valued Problems," GECCO'09, Montreal, Jul. 2009, Assoc. for Computing Machinery, 8pp.
Idesign lab, "ALPS—the Age-Layered Population Structure," UC Santa Cruz web article printed Mar. 17, 2011, 3 pp. (http://idesign.ucsc.edu/projects/alps.html).
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Li, Xiaodong, and Michael Kirley. "The effects of varying population density in a fine-grained parallel genetic algorithm." Evolutionary Computation, 2002. CEC'02. Proceedings of the 2002 Congress on. vol. 2. IEEE, 2002.
Fidelis, Marcos Vinicius, Heitor S. Lopes, and Alex A. Freitas. "Discovering comprehensible classification rules with a genetic algorithm." Evolutionary Computation, 2000. Proceedings of the 2000 Congress on. vol. 1. IEEE, 2000.
Dec. 23, 2008, International Search Report and Written Opinion for PCT/US2008/82876, 6 pp.
Nov. 26, 2012 Extended EP Search Report for EP 08847214, 9 pp.
Jun. 16, 2011 Written Opinion from Singapore Patent Office in related application SG 201003127-6, 9 pp.
Apr. 20, 2012 Exam Report for related application AU 2008323758, 2 pp.
Lehman, Joel, and Kenneth O. Stanley. "Exploiting open-endedness to solve problems through the search for novelty." Alife. 2008. (Year: 2008).
Al-Haj Baddar, S.W., "Finding Better Sorting Networks," Dissertation to Kent State University for PhD, May 2009, 86 pages.
Cuccu, G., et al., "When Novelty is Not Enough," vol. 6624 in Lecture Notes in Computer Science, published in Applications of Evolutionary Computation, Springer-Verlag Berlin Heidelberg, Copyright 2011, pp. 234-243.
Gomes, J., et al., "Devising Effective Novelty Search Algorithms: A Comprehensive Empirical Study," Madrid, Spain, Copyright Jul. 11-15, 2015, ACM, 8 pages.
Gomes, J., et al., "Evolution of Swarm Robotics Systems with Novelty Search," published in Swarm Intelligence, vol. 7, Issue 2, ANTS Special Issue, Copyright Sep. 2013, pp. 115-144.
Gomes, J., et al., "Progressive Minimal Criteria Novelty Search," Lisboa, Portugal, cited in Advances in Artificial Intelligence, Springer-Verlag Berlin Heidelberg, Copyright 2012, pp. 281-290.
Gupta, D. et al., "An Overview of methods maintaining Diversity in Generic Algorithms," International Journal of Emerging Technology and Advanced Engineering, vol. 2, Issue 5, New Delhi, India, May 2012, pp. 56-60.
Hodjat, B., et al., "Maintenance of a Long Running Distributed Genetic Programming System for Solving Problems Requiring Big Data," Genetic Finance Chap 1, published in Genetic Programming Theory and Practice XI as Chapter I, Copyright 2014, 20 pages.
Kipfer, P., et al., "UverFlow: A GPU-Based Particle Engine," Computer Graphics and Visualization, The Eurographics Association, Copyright 2004, 9 pages.
Krcah, P., et al., "Combination of Novelty Search and Fitness-Based Search Applied to Robot Body-Brain Co-Evolution," Charies University, Prague Czech Republic, in Proceedings of the 13th Czech-Japan Seminar on Data Analysis and Decision Making in Service Science, 2010, 6 pages.
Lehman, J., et al., "Abandoning Objectives: Evolution through the Search for Novelty Alone," Evolutionary Computation journal, MIT Press, Copyright 2011, pp. 189-223.
Lehman, J., et al., "Efficiently Evolving Programs through the Search for Novelty," Proceedings of the Genetic and Evolutionary Computation Conference, ACM New York NY, Copyright 2010, 8 pages.

(56) References Cited

OTHER PUBLICATIONS

Lehman, J., et al., "Evolving a Diversity of Creatures through Novelty Search and Local Competition," Proceedings of the Genetic and Evolutionary Computation Conference, ACM, Copyright 2011, 8 pages.
Lehman, J., et al., "Extinction Events Can Accelerate Evolution," PLOS ONE, journal.pone.0132886, Aug. 12, 2015, 16 pages.
Lehman, J., et al., "Overcoming Deception in Evolution of Cognitive Behaviors," University of Texas at Austin, ACM, Jul. 12-16, 2014, 8 pages.
Lehman, J., et al., "Revising the Evolutionary Computation Abstraction: Minimal Criteria Novelty Search," Proceedings of the Genetic and Evolutionary Compulation Conference, ACM, Copyright 2010, 8 pages.
Oreilly, U., et al., "EC-Star: A Massive-Scale, HUB and Spoke, Distributed Genetic Programming System," Evolutionary Design and Optimization Group, published in Genetic Programming and Theory X as Chapter 6, published in V as Chap 1, Springer New York, Copyright 2013, 14 pages.
Salge, C., et al., "Empowerment—An Introduction," published in Guided Self-Organization: Inception, Chap 4, University of Hertfordshire, Copyright 2014, pp. 67-114.
Secretan, J., et al., "Picbreeder: A Case Study in Collaborative Evolutionary Exploration of Design Space," Evolutionary Computation journal, MIT Press, Copyright 2011, 30 pages.
Shahrzad, H., et al., "Tackling the Boolean Multiplexer Function Using a Highly Distributed Genetic Programming System," published in Genetic Programming Theory and Practice XII, Springer International Publishing, Copyright 2015, pp. 167-179.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wissner-Gross, A.D., et al., "Causal Entropic Forces," Physical Review Letters, PRL 110.168702, American Physical Society, Apr. 19, 2013, 5 pages.
International Search Report and Written Opinion for PCT App. No. PCT/IB16/01060, dated Jan. 24, 2017.
Cempel et al., "Multidimensional condition monitoring of machines in non-stationary operation," Mechanical Systems and Signal Processing 21, No. 3 (2007), 11 pages.
Adami et al., "Evolutionary learning in the 2D artificial life system 'Avida'." In Artificial life IV, vol. 1194, Cambridge, MA: The MIT Press, 1994, 5 pages.
Mitchell et al., "Genetic algorithms and artificial life," Artificial life, 1(3), 1994, 267-289.
Pontoppidan et al., "Non-stationary condition monitoring through event alignment," In Machine Learning for Signal Processing, Proceedings of the 2004 14th IEEE Signal Processing Society Workshop, IEEE, 2004, pp. 499-508.
Oduguwa et al., "Bi-level optimisation using genetic algorithm," In Artificial Intelligence Systems, ICAIS IEEE International Conference on, 2002, pp. 322-327.
Hickinbotham et al. "Embodied genomes and metaprogramming," Advances in artificial life, ECAL 2011, pp. 334-341.
Hickinbotham et al. "Diversity from a Monoculture-Effects of Mutation-on-Copy in a String-Based Artificial Chemistry," ALife, 2010, pp. 24-31.
Jing et al., "From ALife agents to a kingdom of N queens," In Jiming Liu and Ning Zhong (Eds.), Intelligent Agent Technology: Systems, Methodologies, and Tools, 1999, 13 pages.
Hodjat et al., "Introducing a dynamic problem solving scheme based on a learning algorithm in artificial life environments," Neural Networks, 1994, IEEE International Conference on. vol. 4., pp. 2332-2338.
Von Neumann, John, and Arthur W. Burks. "Theory of self-reproducing automata." IEEE Transactions on Neural Networks 5.1 (1966): 64-87.
Spector, Lee. "Autoconstructive evolution: Push, pushGP, and pushpop." Proceedings of the Genetic and Evolutionary Computation Conference (GECCO-2001). vol. 137146. 2001, 11 pages.
Ray, Thomas S. "An evolutionary approach to synthetic biology: Zen and the art of creating life." Artificial Life 1.1_2 (1993): 39 pages9.
Ofria et al., "Design of evolvable computer languages," Evolutionary Computation, IEEE Transactions on 6.4 (Aug. 2002): 420-424.
Moore et al., "Development and evaluation of an open-ended computational evolution system for the genetic analysis of susceptibility to common human diseases," Evolutionary Computation, Machine Learning and Data Mining in Bioinformatics. Springer Berlin Heidelberg, 2008. 129-140.
Baugh et al., "Evolution of GP mapping in a von Neumann Self-reproducer within Tierra," Advances in Artificial Life, ECAL. vol. 12. 2013, pp. 210-217.
Wagner et al., "Perspective: complex adaptations and the evolution of evolvability," Evolution (1996): 967-976.
Agogino et al., "Unifying temporal and structural credit assignment problems, "Proceedings of the Third International Joint Conference on Autonomous Agents and Multiagent Systems—vol. 2. IEEE Computer Society, 2004, 8 pages.
Xie et al., "Multiagent optimization system for solving the traveling salesman problem (TSP),"Systems, Man, and Cybernetics, Part B: Cybernetics, IEEE Transactions on 39.2 (2009): 489-502.
Cremer et al., "Growth dynamics and the evolution of cooperation in microbial populations," Scientific reports, 2:281 (2012), 6 pages.
Woese, "The universal ancestor," Proceedings of the National Academy of Sciences 95.12 (1998): 6854-6859.
Whitacre et al. "Evolutionary mechanics: new engineering principles for the emergence of flexibility in a dynamic and uncertain world," Natural computing 113 (2012): 21 pages.
Spector et al., "Emergence of collective behavior in evolving populations of flying agents," Genetic Programming and Evolvable Machines 6.1 (2005): 111-125.
Bedau et al., "A comparison of evolutionary activity in artificial evolving systems and in the biosphere," In Proceedings of the fourth European Conference on Artificial life, pp. 125-134. MIT Press/ Bradford Books, 1997, 12 pages.
Hodjat et al., "The Self-organizing symbiotic agent," arXiv preprint cs/9812013 (1998), 12 pages.
Ackley et al., "Indefinitely Scalable Computing=Artificial Life Engineering," Alife 14: The Fourteenth Conference on the Synthesis and Simulation of Living Systems. vol. 14 (2014), 8 pages.
Casillas et al., "Fuzzy-XCS: A Michigan genetic fuzzy system," Fuzzy Systems, IEEE Transactions on 15:4 (2007), 536-550.
Hickinbotham et al., "Specification of the stringmol chemical programming language," version 0.2, Technical Report YCS-2010-458, Univ. of York, 2010, 48 pages.
Han, Jing, "Local and global evaluation functions for computational evolution." Complex Systems, vol. 15, No. 4 (2005), 41 pages.
Bedau et al., "Evolution of evolvability via adaptation of mutation rates," Biosystems 69.2 (2003): 31 pages.
Koza, "Genetic Programming: On the Programming of Computers by Means of Natural Selection", Dec. 1992, MIT Press, pp. 1-609.
Sacks et al., "Design and Analysis of Computer Experiments," Statistical Science 4:4, 1989, 409-435.
Davarynejad et al., "A Novel General Framework for Evolutionary Optimization: Adaptive Fuzzv Fitness Granulation," CEC Sep. 2007, 6 pp.
Tanev, I., et al., "Scalable Architecture for Parallel Distributed Implementation of Genetic Programming on Network of Workstations," J. Systems Architecture, vol. 47, Jul. 2001, pp. 557-572.
International Search Report and Written Opinion for PCT Application No. PCT/US2008/82876, Dec. 23, 2008, 8 pp.
Jun. 16, 2011 Written Opinion from Singapore Patent Office in related application SG 201003127-68 pp.
Fidelis, Marcos Vinicius, Heitor S. Lopes, and Alex A. Freitas, "Discovering Comprehensible Classification Rules With a Genetic Algorithm," 6 pages, Proceedings of the 2000 Congress on Evolutionary Computation, vol. 1, IEEE, 2000.

(56) References Cited

OTHER PUBLICATIONS

Shahrzad, et al., "Tackling the Boolean Multiplexer Function Using a Highly Distributed Genetic Programming System," in Genetic Programming Theory and Practice XII, 7 pp., 2015.

* cited by examiner

ALIFE MACHINE LEARNING SYSTEM AND METHOD

CROSS-REFERENCE TO OTHER APPLICATIONS

This application is a Continuation-In-Part of PCT Application No. PCT/IB2016/001060, filed 27 Jun. 2016, entitled "ALIFE MACHINE LEARNING SYSTEM AND METHOD", which claims priority to U.S. Provisional Application No. 62/184,803, filed 25 Jun. 2015, entitled "ALIFE PROBLEM SOLVING SYSTEM". Both of the above applications are incorporated herein by reference for their teachings.

U.S. Pat. No. 8,909,570, entitled "DATA MINING TECHNIQUE WITH EXPERIENCE-LAYERED GENE POOL", is also incorporated herein by reference for its teachings.

U.S. patent application Ser. No. 14/011,062, filed 27 Aug. 2013, entitled "DATA MINING TECHNIQUE WITH FEDERATED EVOLUTIONARY COORDINATION", is also incorporated herein by reference for its teachings.

U.S. application Ser. No. 15/146,846, filed 4 May 2016, entitled "DATA MINING TECHNIQUE WITH DISTRIBUTED NOVELTY SEARCH", is also incorporated herein by reference for its teachings.

BACKGROUND

The invention relates generally to data mining using artificial intelligence, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

Many techniques have been applied to the problem, but the present discussion concerns a class of techniques known as evolutionary algorithms. Evolutionary algorithms, which are supersets of Genetic Algorithms, are classifiers which are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of a typical evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population typically are created randomly, by putting together the building blocks, or alphabets, that form an individual. The alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

In a typical evolutionary process, individuals are trained on training data, during which time their rules evolve to negotiate the training data well. Then they are deployed in a production environment, where they are expected to operate just as well. An assumption is made that the production data will be similar in character to the training data, or at least that the individual will have evolved sufficient generalization that it will operate properly with the production data. But neither is always true.

Some systems attempt to ensure sufficient generalization by, after training and before deployment, validating the evolved individuals on out-of-sample (i.e., previously unseen) test data. However, even individuals which pass validation may not work properly with some production data, which might be different in character from both the training data and the validation data. For example, some problem domains exist where external unpredicted events may change the underlying rules of governing the problem model (e.g., fraud detection, monitoring systems in healthcare, personalized pricing of insurance premiums, network load balancing, self-driving cars, factory maintenance diagnostics, recommendation engines, and robot navigation). The present invention addresses this problem, among others.

SUMMARY

Roughly described, aspects of the invention address the above problem and others by providing a problem solving platform that distributes the solving of the problem over a plurality of evolvable individuals, each of which has its own plurality of evolvable actors. The population of evolving actors has the ability to contribute collaboratively to the emergence of a solution at the level of the individual, as opposed to each actor being a candidate for the full solution. Populations evolve both at the level of the individual and at the level of actors within an individual. An evolved individual having its evolved population of actors is likely to solve similar problems effectively and consistently. In an embodiment, an individual defines a set of parameters according to which its population of actors can evolve. The individual is fixed prior to deployment to a production environment, but its actors can continue to evolve and adapt while operating in the production environment. Thus a goal of the evolutionary process at the level of individuals is to find populations of actors that can sustain themselves and survive, solving a dynamic problem for a given domain as a consequence. Ultimately, embodiments of the system can be used to generate machine learning systems that are tolerant to noise or changes in the problem domain.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One characteristic of some data mining environments is that unlike many other environments in which evolutionary algorithms can be applied, the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues.

Example Embodiment

Figure 1:
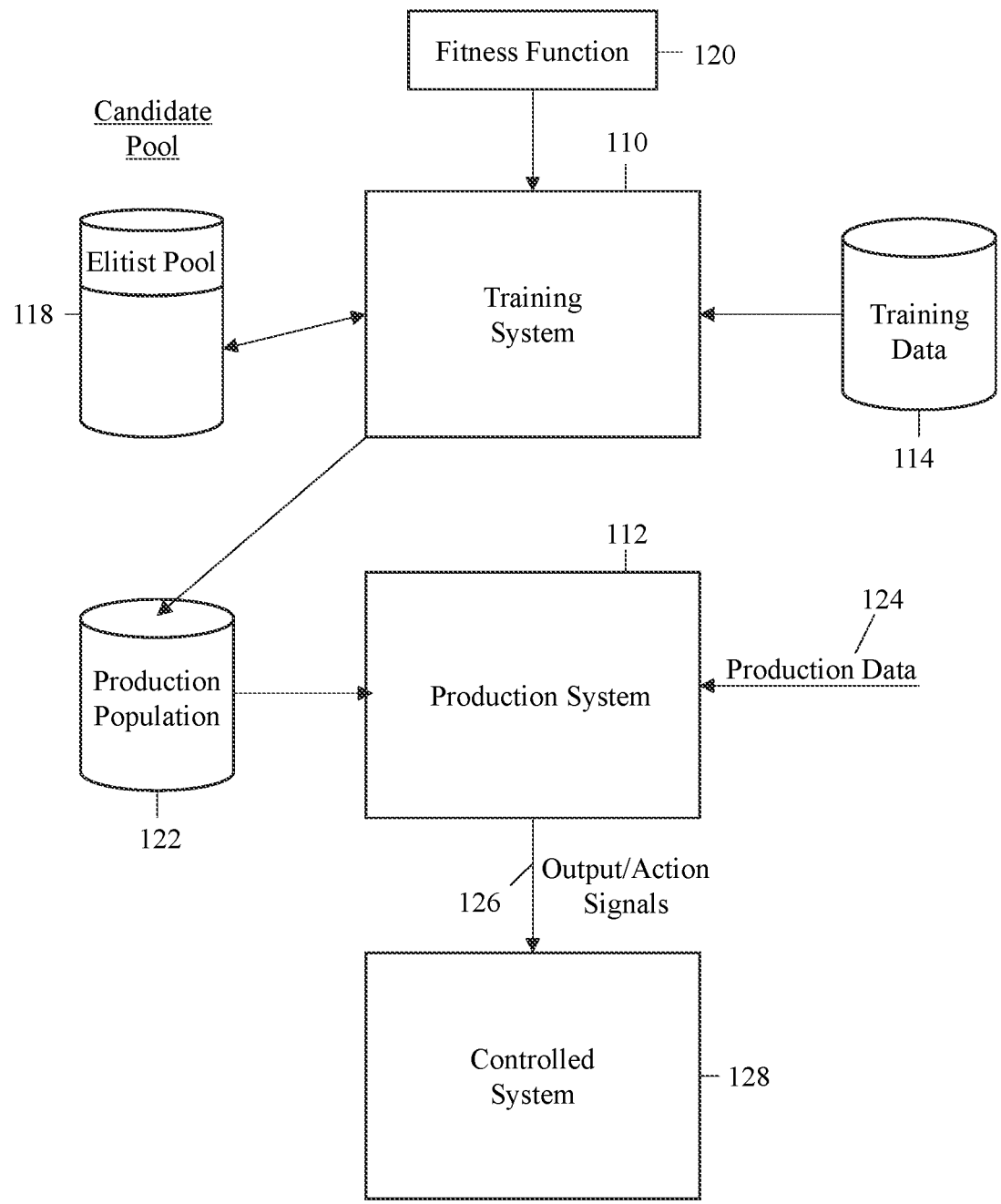
FIG. 1 is an overall diagram of an embodiment of a data mining system incorporating features of the invention.

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate pool. As used herein, the term "database" does not necessarily imply any unity of structure. For example, two or more separate databases, when considered together, still constitute a "database" as that term is used herein. In particular, though candidate pool 116 may appear in FIG. 1 as a unitary structure, in some embodiments it is actually spread over multiple storage units. The candidate pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. The fitness function may also incorporate pressure toward novelty of behavior, such as is described in the above-incorporated DATA MINING TECHNIQUE WITH DISTRIBUTED NOVELTY SEARCH provisional application. In an embodiment in which the training system contains a hierarchy of evolutionary coordinators, not all of them need operate according to the same fitness function. Lower members of the hierarchy may operate to favor novelty, for example, whereas upper members of the hierarchy may operate to favor fitness.

The production system 112 operates according to a production population of "deployed" individuals in another database 122. The production system 112 applies these individuals to production data 124, and produces outputs 126, which may be action signals or recommendations. In a financial asset trading environment, for example, the production data 124 may be a stream of real time stock prices and the outputs 126 of the production system 112 may be the trading signals or instructions that one or more of the individuals in production population 122 outputs in response to the production data 124. In the healthcare domain, the production data 124 may be current patient data, and the outputs 126 of the production system 112 may be a suggested diagnosis or treatment regimen that one or more of the individuals in production population 122 outputs in response to the production data 124. The production population 122 is harvested from the training system 110 once or at intervals, depending on the embodiment. Preferably, only individuals from elitist pool 118 are permitted to be harvested. In an embodiment, further selection criteria is applied in the harvesting process.

The controlled system 128 is a system that is controlled automatically by the signals 126 from the production system. Depending on the application environment, the controlled system 128 may include mechanical systems such as a engines, air-conditioners, refrigerators, electric motors, robots, milling equipment, construction equipment, or a manufacturing plant. In a healthcare embodiment, the controlled system may include actuators to effect a particular treatment to a patient, or merely a monitor or alarm which alerts medical personnel to a potential issue. In a financial asset trading environment, the controlled system may be a fully automated brokerage system which receives the trading signals via a computer network (not shown in FIG. 1) and takes the indicated action. Note that in an embodiment, sometimes referred to herein as an "online learning" embodiment, there is no separation between the training system and the production system; training occurs based on live data and results arising from the production environment. There may be no separate step of "deployment".

As will be seen, each of the candidate individuals in the candidate pool 118 has both a pool of "actors" associated therewith, as well as a set of parameters which influence evolution of the actors in the individual's pool. The actions asserted by an individual are formed in response to sub-actions, or mini-actions, asserted by the individual's actors. As used herein, "actions" include not only outputs which cause something to occur, but also outputs which are merely visible to others. Individuals are evolved through testing on training data, competition according to the relevant fitness function, and procreation among candidate individuals that survive the competition. And during the training, the actors of the individual also evolved in accordance with the individual's then-current set of parameters. Each individual stores its parameters in an associated configuration database, which constitutes the individual's genome for purposes of the procreation step.

Also as will be seen, the production system operates deployed individuals from the production population to assert actions in dependence upon the production data, the actions asserted by the deployed individual being dependent on the response of the actors of the deployed individual to the production data. In addition, the actors of the individual also continue to evolved in accordance with the individual's then-fixed set of parameters.

Though not required in all embodiments of the present invention, in one embodiment the evolution of individuals (but not actors) takes advantage of experience layering techniques such as those set forth in the above-incorporated DATA MINING TECHNIQUE WITH EXPERIENCE-LAYERED GENE POOL patent. Aspects of that technique are described here for convenience.

Figure 2:
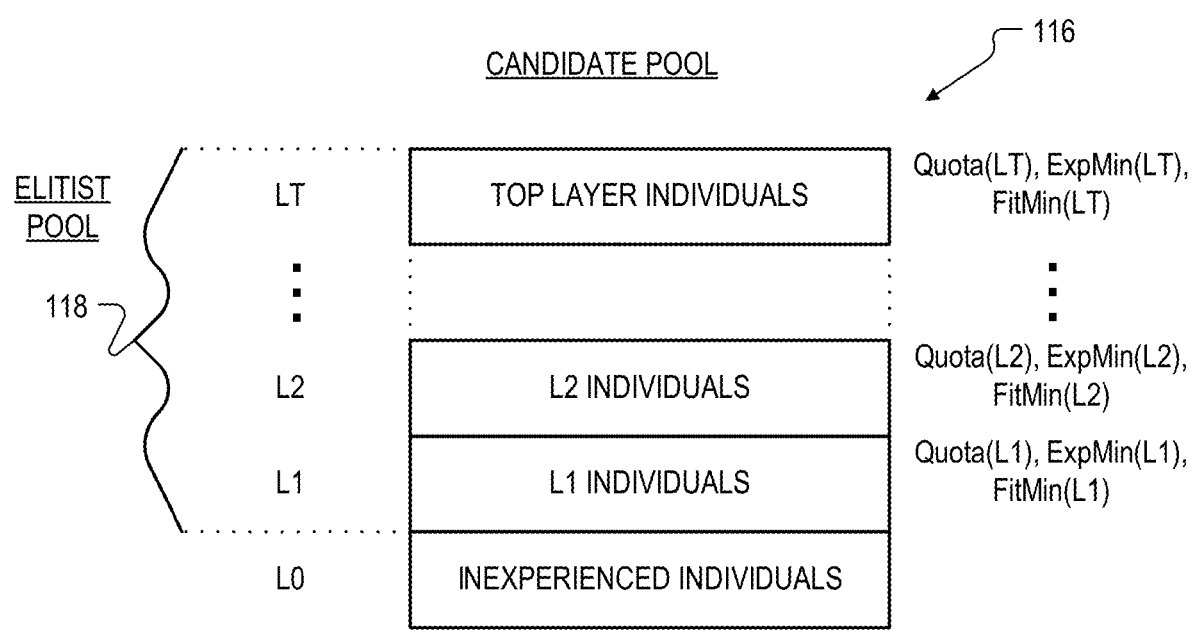
FIG. 2 is a symbolic drawing of the candidate pool in FIG. 1.

FIG. 2 is a symbolic drawing of the candidate pool 116 in FIG. 1 in such an embodiment. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota Quota($L_i$) for the layer, a range of experience levels [ExpMin($L_i$) . . . ExpMax($L_i$)] for the layer, and the minimum fitness FitMin($L_i$) for the layer. For example, an embodiment may have on the order of 40 or 50 layers in the elitist pool, each containing individuals with experience levels within a range on the order of 4000-5000 trials. The minimum experience level ExpMin($L_1$) may be on the order of 8000-10,000 trials, and each layer may have a quota on the order of 100 individuals.

In the embodiment of FIG. 2, the quotas for all the layers in the elitist pool 118 are equal and fixed. In addition, ExpMin($L_0$)=0 in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate pool 116 are stored and managed by conventional database management systems (DBMS), and are accessed using SQL statements. In another embodiment, the individuals in candidate pool 116 are stored in a linked list.

The training data in the database 114 are arranged as a set of data samples, each with parameters and their values, as well as sufficient information to determine a result that can be compared with an assertion made by an individual on the values in the sample. The values in each sample are some of the "indicators" that individuals can refer to in order to develop an action. Indicators are represented in the training database 114, as well as in the production data 124. In a financial asset trading embodiment, for example, indicators can include such values as time of day, current profit position, current share price, sector volatility, and so on. In a healthcare embodiment, the indicators can include a patient's vital signs, and past treatment and medication history, for example. Indicators can also be introspective, for example by indicating the fitness estimate of the individual at any given moment.

The 'result' indicated by a set of data samples, in one embodiment, can be explicit, for example a number set out explicitly in association with the data sample. In such an embodiment, the fitness function can be dependent upon the number of samples for which the individual's output matches the result of the sample. In another embodiment, such as for a time series classifier, the result may be only implicit. For example, the sample may include a blood pressure measurement at each of a sequence of times for a particular patient, and the training system 110 must hypothetically perform all the actions asserted by the individual throughout the time series in order to determine whether and to what extent the individual properly predicts the patient's blood pressure at the end of the time series. The fitness function can be dependent upon the accuracy of the prediction the sample. Note that a time series classifier is an example of a more general classifier for ordered sets of data, in which the "event data" are ordered according to an index which need not necessarily be temporal. The individual data points within a sample are sometimes referred to herein as "events", even if the index is not temporal.

Federated Client/Server Arrangement

In some environments, the training data used to evaluate an individual's fitness can be voluminous. Therefore, even with modern high processing power and large memory capacity computers, achieving quality results within a reasonable time is often not feasible on a single machine. A large candidate pool also requires a large memory and high processing power. Though not required in all embodiments of the present invention, in one embodiment a federated client/server model is used to provide scaling in order to achieve high quality evaluation results within a reasonable time period. Such a federated model is described in the above-incorporated DATA MINING TECHNIQUE WITH FEDERATED EVOLUTIONARY COORDINATION patent application. Aspects of that technique are described here for convenience.

Figure 3:
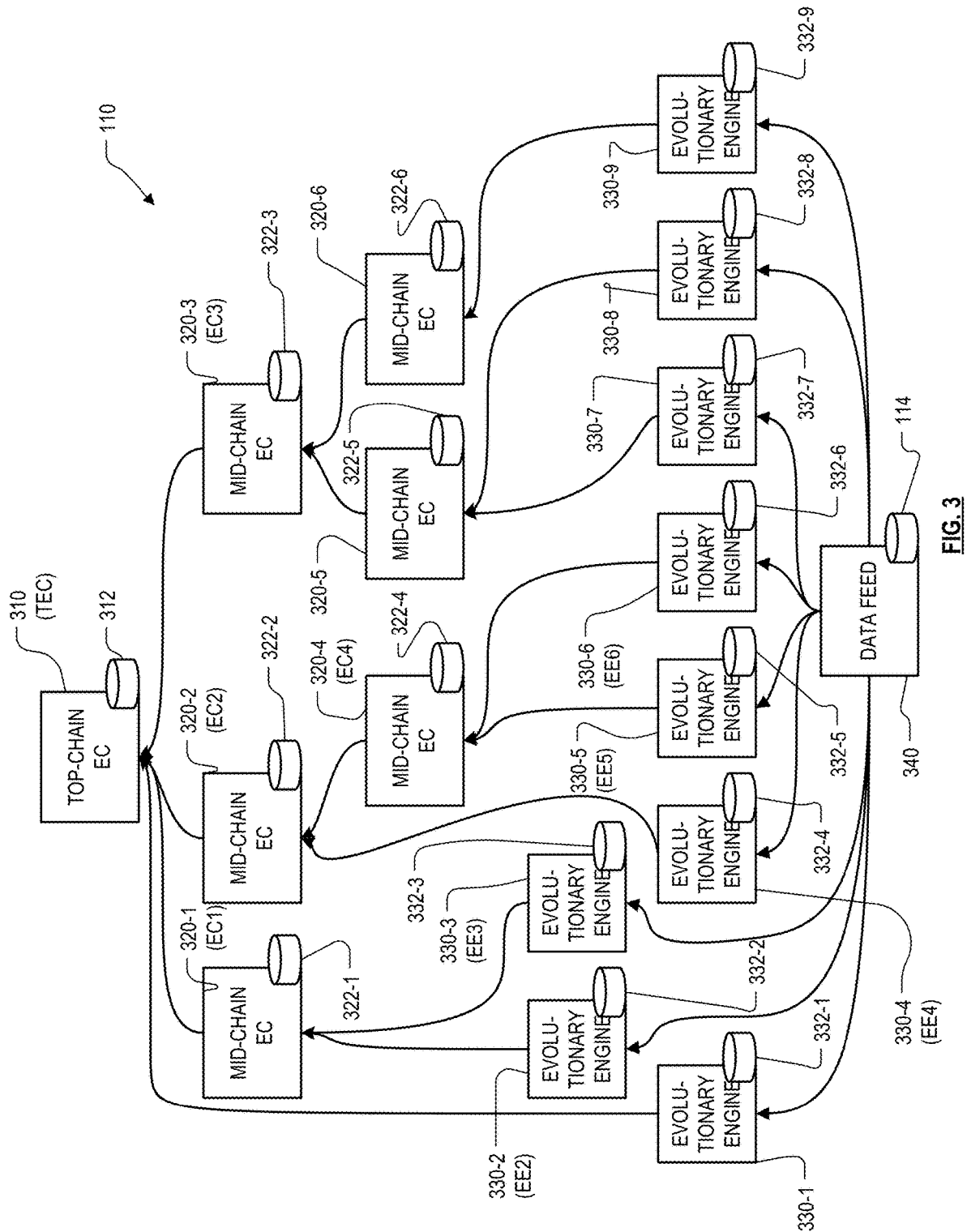
FIG. 3 is a symbolic diagram of training system of FIG. 1.

FIG. 3 is a symbolic diagram of training system 110. It comprises a top-chain evolutionary coordinator (EC) 310, which is also sometimes referred to herein as the master EC. Top-chain EC 310 maintains the master candidate pool 312.

Down-chain from the top-chain EC 310 is a set of mid-chain EC's 320-1 through 320-6 (collectively 320). Specifically, mid-chain EC's 320-1 through 320-3 are immediately down-chain from top-chain EC 310. Mid-chain EC 320-4 is immediately down-chain from mid-chain EC 320-2, and mid-chain EC's 320-5 and 320-6 are each immediately down-chain from mid-chain EC 320-3. Each of the mid-chain EC's 320 maintains its own local candidate pool 322-1 through 322-6, respectively (collectively 322).

Down-chain from the mid-chain EC's 320 are a plurality of evolutionary engines (EE's) 330-1 through 330-9 (collectively 330). Specifically, EE 330-1 is immediately down-chain from top-chain EC 310, and EE's 330-2 and 330-3 are each immediately down-chain from mid-chain EC 320-1. EE 330-4 is immediately down-chain from mid-chain EC 320-2, and EE's 330-5 and 330-6 are each immediately down-chain from mid-chain EC 320-4. EE's 330-7 and 330-8 are each immediately down-chain from mid-chain EEC 320-5, and EE 330-9 is immediately down-chain from mid-chain EEC 320-6. Like the EC's 320, each of the EE's 330 maintains its own local candidate pool 332-1 through 332-6, respectively (collectively 332).

Each EE 330 further has a communication port through which it can access one or more data feed servers 340, which retrieve and forward training samples from the training database 114. Alternatively, although not shown, the training samples may be supplied from data feed server 340 to the EE's 330 via one or more of the EC's 320. The data feed server 340 can also be thought of as simply a port through which the data arrive or are retrieved. Each of the EC's 310 and 320 maintains a local record of the IP address and port number at which each of its immediate down-chain units receives individuals delegated for evaluation, and delegating an individual to a particular one of the down-chain units for evaluation involves transmitting the individual (or an identification of the individual) toward the IP address and port number of the particular unit.

The EE's 330, and in some embodiments one or more of the EC's 320 as well, are volunteers in the sense that they can come and go without instruction from the up-chain neighboring units. When an EC 320 joins the arrangement, it receives the IP address and port number of its immediately up-chain neighbor, and the minimum experience level acceptable to the up-chain neighbor for candidates being sent up from the new EC 320. EE's 330 joining the arrangement receive that information plus the IP address and port number of data feed server 340. This information can be sent by any server that manages the hierarchy of evolutionary units in the system. In one embodiment that can be the top-chain evolutionary coordinator 310, whereas in another embodiment it can be a separate dedicated management server (not shown).

As used herein, the terms down-chain and up-chain are complementary: if a second unit is down-chain from a first unit, then the first unit is up-chain from the second unit, and vice-versa. In addition, the terms "immediately" up-chain and "immediately" down-chain preclude an intervening evolutionary unit, whereas the terms up-chain and down-chain themselves do not. Even "immediately", however, does not preclude intervening components that are not evolutionary units. Also as used herein, the term "evolutionary unit" includes both evolutionary coordinators and evolutionary engines, and the term "evolutionary coordinator" includes both mid-chain evolutionary coordinators and the top-chain evolutionary coordinator.

In broad overview, all the work in testing of candidate individuals on training data and evolving the individual's actors is performed by the EE's 330. The EE's also generate their own initial sets of individuals, enforce competition among the individuals in their own respective candidate pools 332, and evolve their best performing candidates by procreation. The EC's, on the other hand, perform no testing. Instead they merely coordinate the activities of their respective down-chain units. Each evolutionary unit that has an up-chain neighbor reports up its best performing candidates to its up-chain EC, and also receives additional candidates from its up-chain EC for further testing. As used herein, "deployment" of a candidate is viewed from the point of view of the evolutionary unit that is doing the deploying. If the evolutionary unit has an up-chain EC, then deploying the candidate may simply involve reporting it to an up-chain EC. Each evolutionary unit that has a down-chain neighbor (i.e. each EC in FIG. 3) receives individuals from its respective down-chain units which the down-chain units had considered top performers, and requires the received individuals to compete for entry into the EC's own local candidate pool 322. If a received candidate is one which the EC had previously sent down to the down-chain unit for further testing, then the EC first updates its local understanding of the fitness of the individual prior to the competition. Each EC also sends down candidates from its own local pool for further testing as required. At various times, like the EE's, each EC harvests individuals from its own local pool which the EC considers to be its top performers. If the EC is a mid-chain EC 320, then it sends its harvested individuals to its up-chain EC, which may be the top-chain EC 310 or another mid-chain EC 320. If the EC is the top-chain EC 310, then it sends its harvested individuals for deployment.

It can be seen from FIG. 3 that the branches of the hierarchy of EC's can be very non-uniform in length and spread. A given branch can contain as few as zero mid-chain EC's 320, or as many as ten or more in a given embodiment. A given EC also can support as few as one down-chain unit or as many as ten or more, and some can be EE's 330 while others are other mid-chain EC's 320. This flexibility is facilitated by the rule that each evolutionary unit appears to its immediately up-chain neighboring unit, if it has one, as if it were an evolutionary engine; and appears to its immediately down-chain neighboring units, if it has any, as if it were a top-chain evolutionary coordinator.

Moreover, each of the evolutionary units in FIG. 3 can itself be a cluster of machines rather than just one. It can also be physical or virtual or, in the case of a cluster, partially physical and partially virtual. As a cluster, an evolutionary unit still appears to its up-chain and down-chain units as a single evolutionary engine or evolutionary coordinator as desired, so that the up-chain and down-chain units do not need to know that it is not a simple computer system. For example, one of the mid-chain coordinators can itself be made up of its own internal hierarchy of a top-chain coordinator and one or more mid-chain coordinators, thereby forming a nested arrangement. Similarly, an evolutionary engine can be made up of its own internal hierarchy of units, such as an internal top-chain coordinator up-chain of one or more internal evolutionary engines, with or without a level of internal mid-chain coordinators.

Still further, in the embodiment of FIG. 3, each evolutionary unit has only one immediately up-chain unit. This is so that when a unit harvests an individual and forwards it up-chain, it will not improperly return the individual to an up-chain unit different from the one that delegated it. Another embodiment may have no such restriction, allowing a given evolutionary unit to have more than one immediately up-chain unit. For example, this might be accomplished by associating, with each individual delegated to another unit in the hierarchy, an indication of the unit to which it should be returned after testing. For new individuals created by a unit having more than one immediately up-chain unit (or created by a unit down-chain from a unit having more than one immediately up-chain unit), the arrangement can implement some predetermined algorithm (e.g. a single default, round robin, or random) for determining to which up-chain unit the individual should be sent after testing and harvesting. Numerous additional variations will be apparent to the reader.

In the arrangement of FIG. 3, scaling is carried out in two dimensions, namely in pool size as well as in evaluation of the same individual to generate a more diverse candidate pool so as to increase the probability of finding fitter individuals. The candidate pool is distributed over a multitude of EE's 330 for evaluation. Each EE evaluates its own local candidate pool using data from training database 114, and individuals that satisfy one or more predefined conditions on an EE 330 are transmitted up-chain to form part of the candidate pool in its up-chain EC.

Distributed processing of individuals also may be used to increase the speed of evaluation of a given individual. To achieve this, individuals that are returned to an EC after some testing, but additional testing is desired, may be sent back (delegated) from the EC to a multitude of down-chain units for further evaluation. The evaluation result achieved by the down-chain units (sometimes referred to herein as partial evaluation) for an individual is transferred back to the delegating EC. The EC merges the partial evaluation results of an individual with that individual's fitness estimate at the time it was delegated to arrive at an updated fitness estimate for that individual as regards the EC's local candidate pool. For example, assume that an individual has been tested on 500 samples and is sent from a particular EC to, for example, two down-chain units (which may be an EE 330 or another mid-chain EC 322, or one of each), each instructed to test the individual on 100 additional samples. Each of the down-chain units further tests the individual on the additional 100 samples (the mid-chain EC 320 further delegating that task to its further down-chain units), and reports its own view of the fitness estimate to the requesting up-chain particular EC. The particular EC, having received back the individual with the requested additional testing experience, combines these two estimates with the individual's fitness estimate at the time it was sent to the two down-chain units, to calculate an updated fitness estimate for the individual as viewed by the particular EC. The combined results represent the individual's fitness evaluated over 700 days. In other words, the distributed system, in accordance with this example, increases the experience level of an individual from 500 samples to 700 samples using only 100 different training samples at each evolutionary unit. A distributed system, in accordance with the present invention, is thus highly scalable in evaluating its individuals.

In an embodiment, the top-chain EC 310 maintains locally the master candidate pool. It is experience layered as in FIG. 2, but it does not maintain any candidate individuals below its layer $L_1$. New individuals are created by evolutionary engines 330, and they are not reported to the top-chain EC 310 until they have been tested on sufficient numbers of samples to qualify for the elitist pool 118 of the top-chain EC 310.

Advantageously, EE's 330 are enabled to perform individual procreation locally, thereby improving the quality of their individuals. Each EE 330 is a self-contained evolution device, not only evaluating the individuals in its own pool, but also creating new generations of individuals and moving the evolutionary process forward locally. Thus EE's 330 maintain their own local candidate pool which need not match each other's or that of any of the ECs. Since the EE's 330 continue to advance with their own local evolutionary process, their processing power is not wasted even if they are not in constant communication with their up-chain neighbors. Once communication is reestablished with the up-chain neighbors, EE's 330 can send in their fittest individuals up-chain and receive additional individuals from their up-chain neighbors for further testing.

New individuals created by the EE's 330, both during initialization and by procreation, are not reported up-chain until they have been tested on sufficient numbers of samples to qualify for the elitist pool of the up-chain unit. The number of individuals created by the EE's 330 may vary depending on the memory size and the CPU processing power of the EE's. An EE 330 may be, in addition to the variations mentioned above, a laptop computer, a desktop computer, a cellular/VoIP handheld computer or smart phone, a tablet computer, distributed computer, or the like. An example system may have hundreds of thousands of EE's 330, and an EE 330 may have on the order of 1000 individuals for evaluation.

Figure 4:
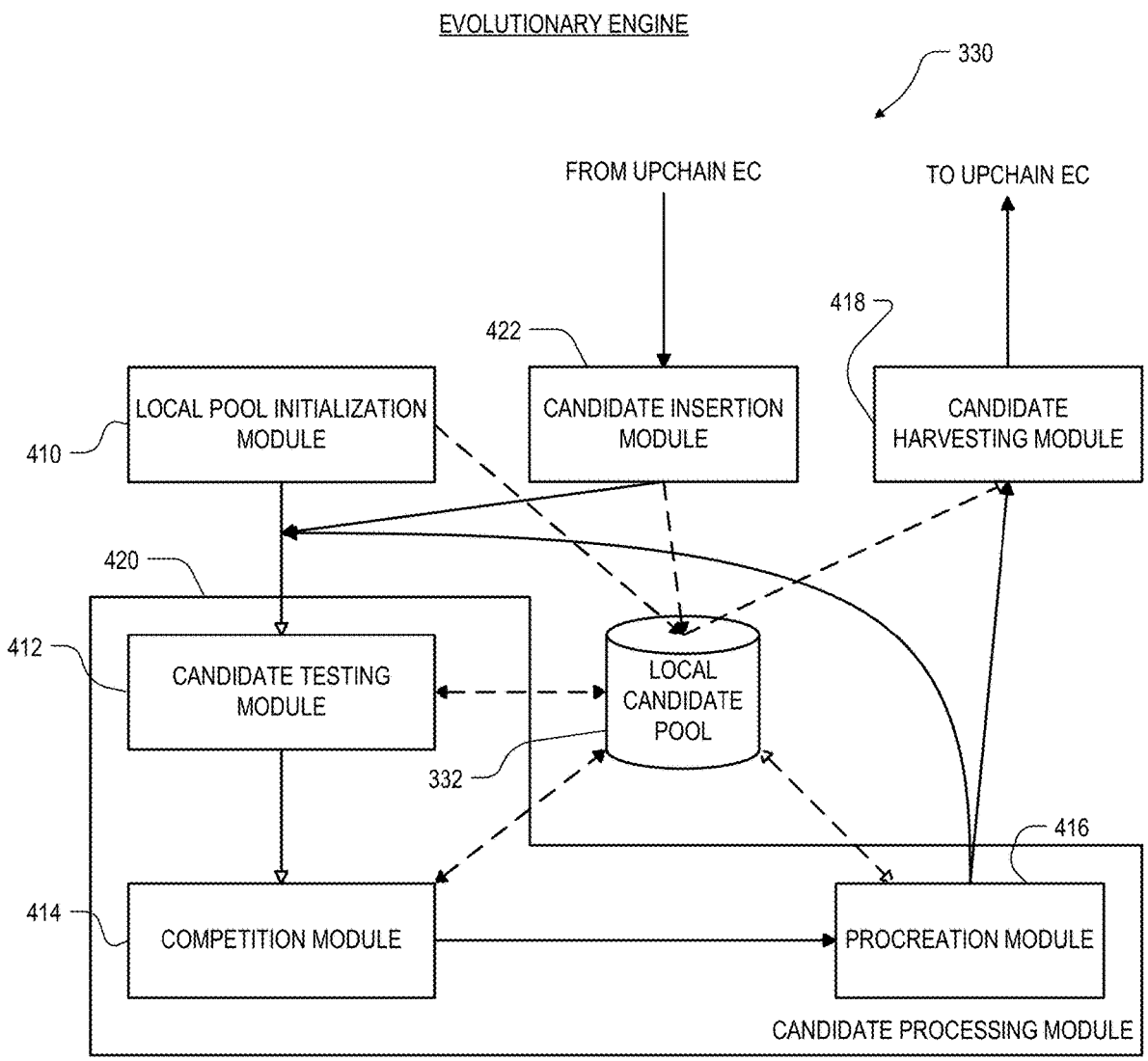
FIG. 4 illustrates various modules that can be used to implement the functionality of an evolutionary engine of FIG. 3.

FIG. 4 illustrates various modules that can be used to implement the functionality of an evolutionary engine 330. The EE's local candidate pool 332 is also shown in the drawing. Generally, solid lines indicate process flow, and broken lines indicate data flow. The modules can be implemented in hardware or software, and need not be divided up in precisely the same blocks as shown in FIG. 4. Some can also be implemented on different processor cores or computers, or spread among a number of different processors or computers. In addition, it will be appreciated that some of the modules can be combined, operated in parallel or in a different sequence than that shown in FIG. 4 without affecting the functions achieved. Also as used herein, the term "module" can include "sub-modules", which themselves can be considered herein to constitute modules. In particular, the candidate testing module 412, competition module 414, and procreation module 416 are also considered herein to be sub-modules of a candidate pool processing module 420. The blocks in FIG. 4 designated as modules can also be thought of as flowchart steps in a method. These comments also apply to FIGS. 5 and 6.

Though not required in all embodiments, in the embodiment of FIG. 3, each of the evolutionary units 310, 320 and 330 implements its own local layered candidate pool as described above with respect to FIG. 2. Unlike the top-chain EC 310, EE's 330 do maintain and develop in their local candidate pools 332 candidates that are in the respective $L_0$ layer, and do not prevent further testing of individuals that have reached the top layer $L_T$ of the local candidate pool 332. Candidate pool 332 has multiple experience layers with experience ranges that are below that of the first experience layer ($L_1$) of the candidate pool of the EE's immediately up-chain EC 320. The candidate pool 332 has experience layers with experience ranges extending consecutively from zero up to and including at least $L_1$ of the EE 330's immediately up-chain EC 320. In one embodiment, the experience layers in candidate pool 332 extend all the way up to and including the experience range of the top layer $L_T$ of the immediately up-chain EC 320. However, in the embodiment of FIG. 3, the EE's 330 implement only two experience layers: $L_0$ and $L_T$, and the minimum experience level of an EE 330's $L_T$ is equal to the minimum experience level of $L_1$ the EE 330's immediately up-chain EC 320.

Individuals are harvested from all layers having a minimum experience level that is at least as high as that of the first layer $L_1$ of the immediately up-chain EC 320.

In the embodiment of FIG. 3, because the candidate pools 332 of the EE's 330 maintain only one experience layer at or above the lowest testing experience layer of their immediately up-chain EC 320, and because candidates are harvested and reported up to the up-chain EC 320 only from that layer, it will be typical that any individuals that are delegated back down to this EE 330 will already have a testing experience level that equals or exceeds the minimum experience level for layer $L_T$ in the EE 330. After a battery of trials, these individuals will compete for a space in the local candidate pool 332 only with individuals in layers $L_T$ and $L_{T-1}$ of the local candidate pool 332, which can sometimes cover a very large range of testing experience. Thus there is a significant likelihood that such individuals will be competing with individuals that have far less testing experience, a mismatch which experience layering is intended to address. The mismatch is tolerated for EE's 330 as a tradeoff for the resource-limited restriction on the number of upper experience layers supported by EE's 330.

Preferably the candidate pool 332 in the EE's 330 are implemented using linked lists, whereas the candidate pools 312 and 322 in the EC's are implemented using a DBMS, both as previously described.

Referring to FIG. 4, the candidate pool 332 is initialized by pool initialization module 410, which creates an initial set of candidate individuals in $L_0$ of the candidate pool 332. Creation of an individual in FIG. 4 involves creation of a configuration list for the individual. These individuals can be created randomly (e.g. random choice of values for each parameter indicated in the configuration list), or by some other algorithm, or in some embodiments a priori knowledge is used to seed the first generation. In another embodiment, individuals from prior runs can be borrowed to seed a new run. At the start, all individuals are initialized with an experience level that is indicated as zero and a fitness estimate that is indicated as undefined. Evolutionary engine 330 also receives candidate individuals from an up-chain evolutionary coordinator 320 or 322 for further testing. These individuals all originated from one of the evolutionary engines 330, which may be different from the one to which it is now being sent. The individual is received by candidate insertion module 422 and inserted into the local candidate pool 332. These individuals retain their experience & fitness estimates as received from the up-chain evolutionary coordinator, and do not compete with the other individuals in the local candidate pool 332 until after a battery of trials (which further refines their fitness estimates and increases their experience levels prior to the competition).

Candidate testing module 412 next proceeds to test the population in the candidate pool 332 on the training data 114. Evolution of the individual's actors also occurs during training, and this is described in more detail below. Unlike the top-chain EC 310, the EE 330 tests all individuals in the local candidate pool 332 (of which there are none initially), not just those below the local top layer $L_T$. Each individual undergoes a battery of tests or trials on the training data 114, each trial testing the individual on one sample of the training data. In one embodiment, each battery might consist of only a single trial. Preferably, however, a battery of tests is much larger, for example on the order of 1000 trials. In one embodiment, at least the initial battery of tests includes at least ExpMin($L_1$) trials for each individual, to enable the initial individuals to qualify for consideration for the first layer of the elitist pool in local candidate pool 332. Note there is no requirement that all individuals undergo the same number of trials. After the tests, candidate testing module 412 updates the local fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum. It will be appreciated that the fitness estimate maintained in the local candidate pool 332 represents the individual's fitness as viewed by the current evolutionary engine 330. If the individual had been sent down from a mid-chain EC 322 (rather than having been formed originally by the EE 330), then that EC's view of the individual's fitness may well differ. It is for this reason that fitness is sometimes referred to herein as being a fitness version that is "centric" to one unit or another (i.e. as viewed by that unit).

Next, competition module 414 updates the local candidate pool 332 contents in dependence upon the updated fitness estimates. The operation of module 414 is described in more detail in the above-incorporated DATA MINING TECHNIQUE WITH EXPERIENCE-LAYERED GENE POOL patent, but briefly, the module considers individuals from lower layers for promotion into higher layers, selects individuals for discarding that do not meet the minimum individual fitness of their target layer, and selects individuals for discarding that have been replaced in a layer by new entrants into that layer. Again, in an embodiment selection for discarding can also or instead be made with the objective of maximizing novelty of individual behavior compared to other individuals in the layer. Local candidate pool 332 is updated with the revised contents. If an individual marked for discarding had been delegated to the EE 330 for testing, then its selection for discarding is reported back to the up-chain delegating EC 310 or 320 before being deleted from the local candidate pool 332. If not, then it is simply deleted from the local candidate pool 332.

After the candidate pool 332 has been updated, a procreation module 416 evolves a random subset of them. Only individuals in the local elitist pool (i.e. above layer $L_0$) are permitted to procreate. Any conventional or future-developed technique can be used for procreation. In an embodiment, the values for all or a subset of the parameters indicated in the individual's configuration list are combined in various ways to form child individuals, and then, occasionally, they are mutated. The combination process for example may include crossover—i.e., exchanging parameter values between parent individuals to form child individuals. New individuals created through procreation begin with an experience level of zero and with a fitness estimate that is indicated as being undefined. The individuals actors are instantiated in accordance with the parameters in the individual's configuration list, and the individuals are placed in $L_0$ of the local candidate pool 332. Preferably, after new individuals are created by combination and/or mutation, the parent individuals are retained. In this case the parent individuals also retain their experience level and fitness estimates, and their evolved actors, and remain in their then-current local elitist pool layers. In another embodiment, the parent individuals are discarded.

In another embodiment, procreation can also involve combination (e.g. crossover) and mutation of actors between individuals in the local elitist pool, or simply seeding the offspring's population of actors from sub-populations of actors in the parent individuals.

After procreation, candidate testing module 412 operates again on the updated candidate pool 332. The process continues repeatedly.

Sometime after the top layer of the local candidate pool 332 is full, individuals can be harvested for forwarding to the EE's up-chain EC. Candidate harvesting module 418 retrieves individuals for that purpose. In one embodiment, candidate harvesting module 418 retrieves individuals periodically, whereas in another embodiment it retrieves individuals only in response to user input. Preferably the candidate harvesting module 418 maintains a list of individuals ready for reporting up. It awakens periodically, and forwards all the individuals on the list up-chain. As mentioned, candidate harvesting module 418 preferably selects only from the layer or layers in the local candidate pool 332 whose minimum experience levels are at least as high as the minimum experience level of the lowest level ($L_1$) maintained by the immediately up-chain EC 310 or 320 (or only from among those individuals with at least as high an experience level). Candidate harvesting module 418 also can apply further selection criteria as well in order to choose desirable individuals.

Figure 5:
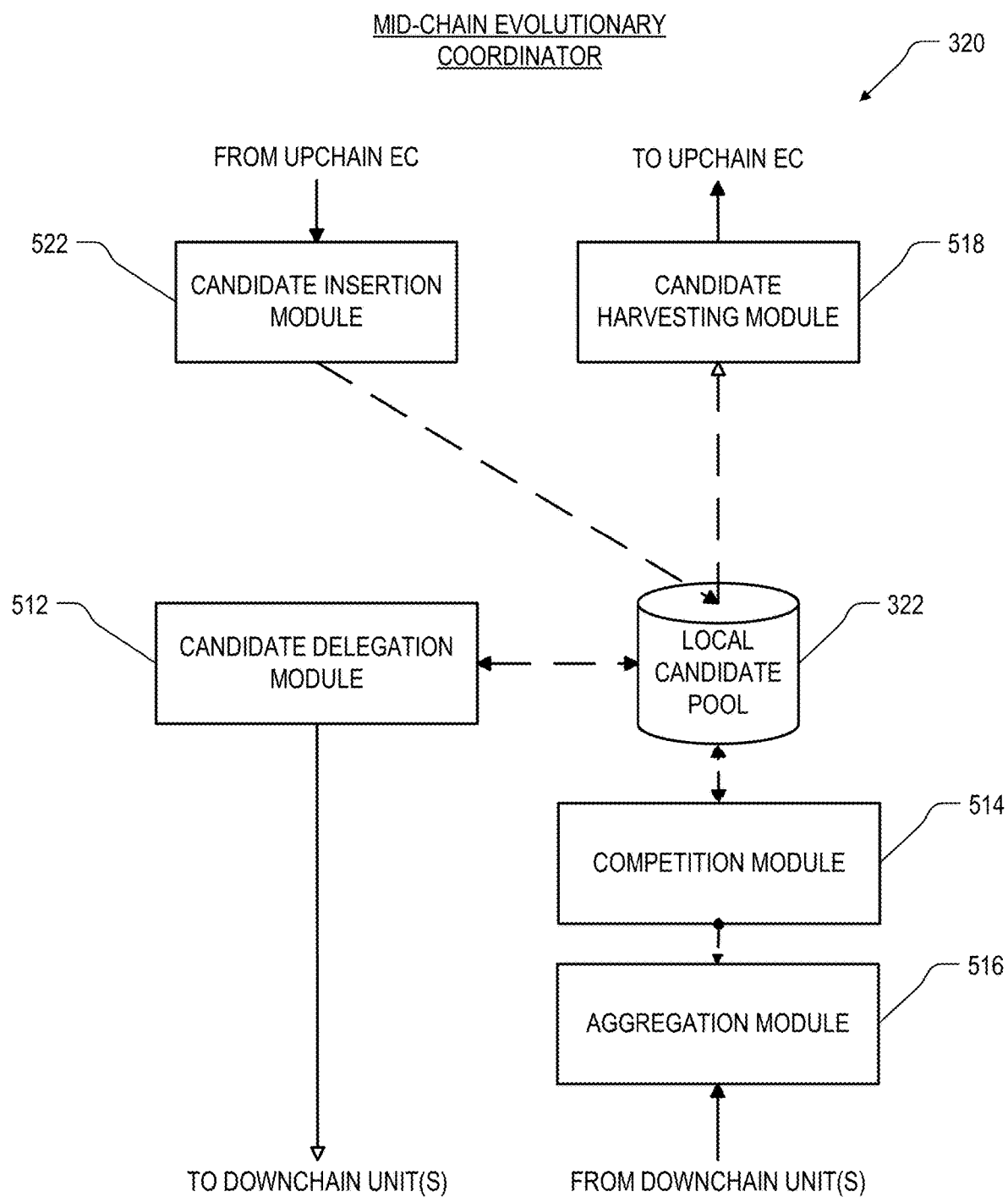
FIG. 5 illustrates various modules that can be used to implement the functionality of a mid-chain evolutionary coordinator of FIG. 3.

FIG. 5 illustrates various modules that can be used to implement the functionality of a mid-chain evolutionary coordinator 320 in the federated embodiment. The EC's local candidate pool 322 is also shown in the drawing. Most of the modules shown in FIG. 5 can in some embodiments operate asynchronously from each other.

As with the evolutionary engines 330, mid-chain evolutionary coordinators 320 also implement a respective local layered candidate pool as described above with respect to FIG. 2. The number of layers in the elitist pool, and the minimum and maximum experience levels of such layers, need not be the same in all the mid-chain EC's, nor need they be the same as those in the evolutionary engines 330, which also need not be the same as each other. Preferably, though, they span a generally higher set of experience levels than the immediately down-chain unit. Like the top-chain EC 310, the local candidate pool 322 of a mid-chain EC 320 does not maintain any candidates in its respective $L_0$, but like the EE's 330, it does not prevent further testing of candidates in its top layer $L_T$.

More specifically, the local candidate pool 322 of each mid-chain evolutionary coordinator 320 maintains multiple experience layers within the testing experience range of its immediately up-chain unit's $L_0$, and also maintains experience layers having testing experience ranges extending upward to and including that of the immediately up-chain unit's $L_T$. The testing experience layers have consecutively increasing experience ranges from $L_1$ of the local candidate pool 322 through $L_T$ of the local candidate pool. Another embodiment could include experience layers with even higher testing experience ranges, but this is typically unnecessary. In general, therefore, the minimum testing experience level of $L_T$ in the candidate pool 322 of each mid-chain EC 320 is at least as high as the minimum testing experience level of $L_T$ in the candidate pool of its immediately up-chain EC, and thus is also at least as high as the minimum testing experience level of $L_T$ in the candidate pool 312 of the top-chain EC 310. Also, typically the minimum testing experience level of $L_1$ of the local candidate pool 322 increases for EC's 320 that are nearer in the hierarchy to the top-chain EC 310, though this is not essential.

Like the EE's 330, individuals are harvested from mid-chain EC's 320 only from the layer or layers in the local candidate pool 322 whose minimum experience levels are at least as high as the minimum experience level of the lowest level ($L_1$) maintained by the immediately up-chain EC 310 or 320 (or only from among those individuals with at least as high an experience level). Candidate harvesting module 418 also can apply further selection criteria as well in order to choose desirable individuals.

Referring to FIG. 5, the candidate pool 322 receives individuals both from the EC's up-chain EC and from its down-chain units. As mentioned, the mid-chain evolutionary coordinators 320 do not perform any of their own testing of candidate individuals, but instead coordinate the testing performed by their down-chain units. Thus mid-chain EC 320 includes a candidate delegation module 512 which selects individuals from its local candidate pool 322 for further testing. The candidate delegation module 512 selects the individuals using a round robin or random method, or any algorithm which tries to increase the experience level of all the individuals in the local candidate pool 322. The candidate delegation module 512 does not need to actively load-balance its down-chain units, since it only sends individuals down to a down-chain unit in response to a request from the down-chain unit for more individuals to test. In fact all communication in the arrangement of FIG. 3 is initiated by the down-chain units (though a different embodiment may operate differently).

Candidates being reported up from below are received by an aggregation module 516. Once a candidate is sent to a down-chain unit, the down-chain unit is required to report it back, even if it failed a competition below and is marked for discarding. Thus candidates received by aggregation module 516 are either individuals that failed below, in which case the mid-chain EC 320 discards the individual from its own local candidate pool 322, or individuals that survived their tests below and are among the fittest individuals that were in the down-chain unit's local candidate pool. Of the latter type, some may be returns of individuals that the EC 320 had previously sent down for further testing, and others may have originated from the down-chain unit or units. If an individual is a return of one that the EC 320 had previously sent down for further testing, then the aggregation module 516 aggregates the contribution that such further testing makes to the overall EC-centric fitness estimate before considering it for acceptance into the EC 320's local candidate pool 322. The aggregation involves subtracting from the experience level and fitness estimate reported for the returned individual, the individual's experience level and fitness estimate as indicated in the snapshot received with the returned individual, to arrive at the contribution made down-chain to the individual's training. That contribution is then merged into the EC 320's own copy of the individual.

If the returned individual is either a new individual that originated below, or a returned individual that is proposed for acceptance into the EC 320's local candidate pool 322, the individual is required to compete for its place in the EC 320's local candidate pool 322. The competition is performed by competition module 514. As for the evolutionary engines 330, the competition module 514 also considers individuals from lower layers for promotion into higher layers in the local candidate pool 322, discards individuals that do not meet the minimum individual fitness of their target layer, and discards individuals that have been replaced in a layer by new entrants into that layer. Local candidate pool 322 is updated with the revised contents.

Evolutionary coordinator 320 also receives candidate individuals from its up-chain evolutionary coordinator 310 or 320 for further testing. These individuals are received by a candidate insertion module 522 in the mid-chain EC 320, but unlike the evolutionary engines 330, these individuals compete for entry into the local candidate pool 322. Received individuals arrive in conjunction with both their fitness estimates and their testing experience levels, and compete for entry into the EC 320's local candidate pool 322 against only those individuals which occupy the same experience layer in the local candidate pool 322. The candidate insertion module 522 also takes a snapshot of the received individuals for returning to the up-chain unit if and when it returns the individual after testing. As for the evolutionary engines 330, the received candidates retain their experience level and fitness estimates from above.

If one of the evolutionary units 320 or 330 receives from its up-chain EC 310 or 320, an individual for evaluation which it is already in the process of evaluating, then the receiving evolutionary unit simply ignores the delegation. The receiving unit knows what individuals it is evaluating because it maintains a list of them, and where they came from, even if it has since further delegated evaluation to other units down-chain. Though the receiving unit has been told twice to evaluate the individual, the up-chain requestor will not be confused by receiving only one resulting report. The unit's report informs the up-chain requestor not only of the unit's testing results, but also the number of trials that the individual underwent under the control of the unit, and this information is used in the merging process performed by the requesting unit.

Sometime after the top layer of the local candidate pool 322 is full, individuals can be harvested for forwarding to the EC's own up-chain EC. Candidate harvesting module 518 retrieves individuals for that purpose. Preferably the candidate harvesting module 518 maintains a list of individuals ready for reporting up. It awakens periodically, and forwards all the individuals on the list up-chain. As mentioned, candidate harvesting module 518 preferably selects only from the layer or layers in the local candidate pool 322 whose minimum experience levels are at least as high as the minimum experience level of the lowest level ($L_1$) maintained by the immediately up-chain EC 310 or 320 (or only from among those individuals with at least as high an experience level). Candidate harvesting module 518 can apply further selection criteria as well in order to choose desirable individuals. If the individuals had previously been received from the up-chain EC for testing, then candidate harvesting module 518 also forwards the snapshot that it took of the individual upon receipt.

Figure 6:
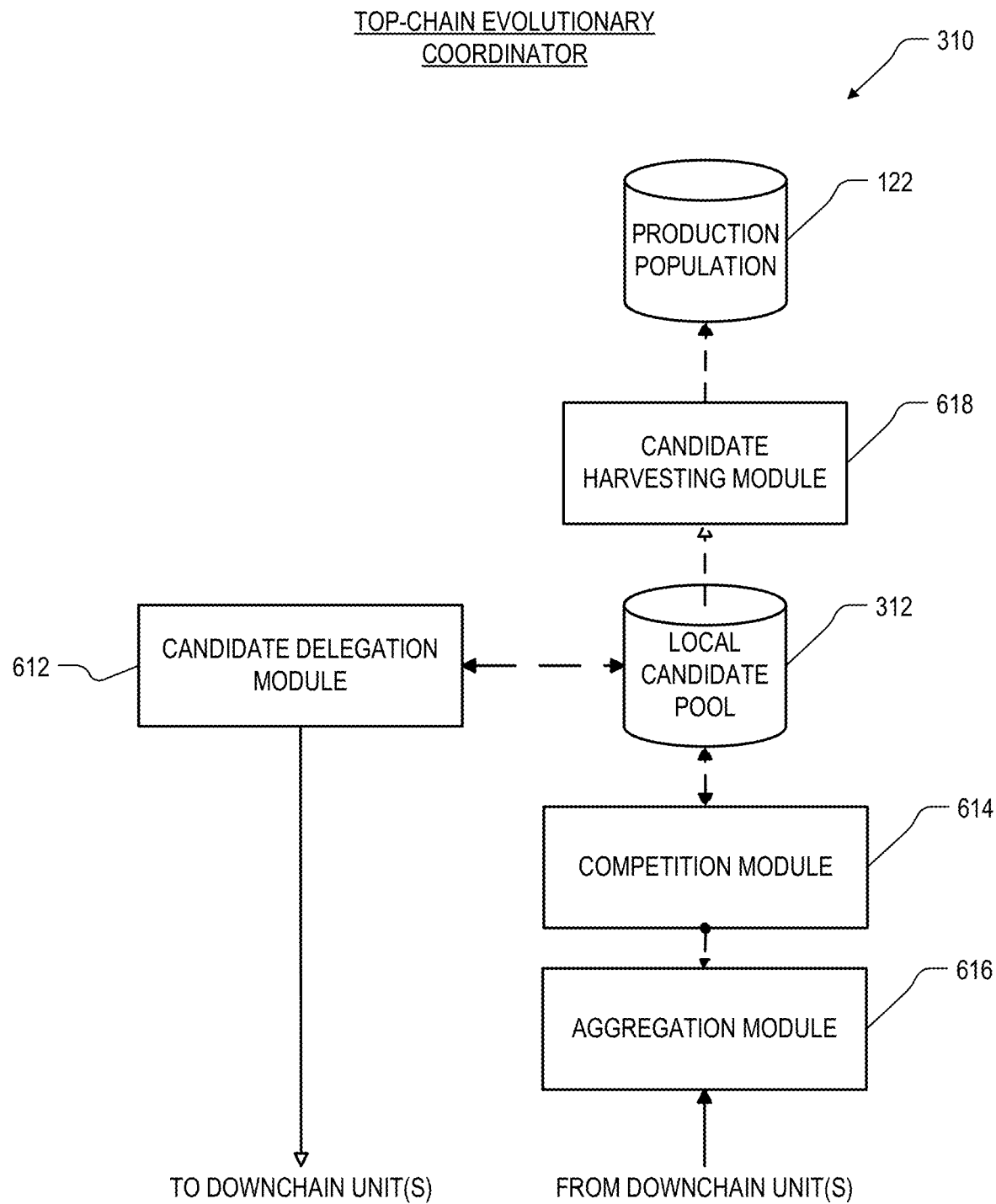
FIG. 6 illustrates various modules that can be used to implement the functionality of a top-chain evolutionary coordinator of FIG. 3.

FIG. 6 illustrates various modules that can be used to implement the functionality of a top-chain evolutionary coordinator 310. The top-chain EC's local candidate pool 312 is also shown in the drawing, as is the production population database 122. Most of the modules shown in FIG. 6 can in some embodiments operate asynchronously from each other.

As with the evolutionary engines 330 and mid-chain evolutionary coordinators 320, the top-chain evolutionary coordinator 310 also implements a local layered candidate pool as described above with respect to FIG. 2. Again the number of layers in the elitist pool, and the minimum and maximum experience levels of such layers, need not be the same as any or all of the down-chain units. Preferably, though, they span a generally higher set of experience levels than all the immediately down-chain units. Like the mid-chain EC's 320, top-chain EC 310 does not maintain any individuals in $L_0$, though it does prevent further testing of individuals in its top layer $L_T$.

More specifically, the local candidate pool 312 has multiple experience layers from its lowers layer $L_1$ to its highest layer $L_T$. Typically $L_1$ of the top-chain EC 310 has a testing experience range whose minimum experience level is higher than that of $L_1$ of each of the mid-chain EC's 320, though it could be equal in another embodiment. Individuals are harvested from only $L_T$ of the top-chain EC 310.

The modules in the top-chain evolutionary coordinator 310 are similar to those in the mid-chain EC's 320, except there is no candidate insertion module for inserting any individuals received from any up-chain neighbor. Instead, all individuals in the local candidate pool 312 were reported up from below.

Referring to FIG. 6, the candidate pool 312 receives individuals from the EC's down-chain units. Top-chain evolutionary coordinator 310 does not perform any of its own testing of candidate individuals, but instead coordinates the testing performed by the down-chain units. Thus top-chain EC 310 includes a candidate delegation module 612 which selects individuals from its local candidate pool 312 for further testing. The candidate delegation module 612 selects the individuals using any algorithm which tries to increase the experience level of all the individuals in the local candidate pool 312 other than those in the top layer $L_T$. The candidate delegation module 612 does not need to actively load-balance its down-chain units, since it only sends individuals down to a down-chain unit in response to a request from the down-chain unit for more individuals to test.

Candidates being reported up from below are received by an aggregation module 616. Similarly as described above for the mid-chain units 320, once the top-chain evolutionary coordinator 310 sends a candidate to a down-chain unit, the down-chain unit is required to report it back, even if the candidate failed a competition below and was discarded. Thus candidates received by aggregation module 616 are either individuals that failed below, in which case the top-chain EC 310 discards the individual from its own local candidate pool 312, or individuals that survived their tests below and are among the fittest individuals that were in the down-chain unit's local candidate pool. Of the latter type, some may be returns of individuals that the top-chain EC 310 had previously sent down for further testing, and others may have originated from a down-chain EE 330. If an individual is a return of one that the top-chain EC 310 had previously sent down for further testing, then the aggregation module 616 aggregates the contribution that such further testing makes to the overall EC-centric fitness estimate before considering it for acceptance in to the top-chain EC 310's local candidate pool 312. The aggregation methodology described above for the mid-chain EC's 320 can be used for the top-chain EC 310 as well.

If the returned individual is either a new individual that originated below, or a returned individual that is proposed for acceptance into the top-chain EC 310's local candidate pool 312, the individual is required to compete for its place in the EC 310's local candidate pool 312. The competition is performed by competition module 614. As for the evolutionary engines 330 and mid-chain evolutionary coordinators 320, the competition module 614 considers individuals from lower layers for promotion into higher layers in the local candidate pool 312, discards individuals that do not meet the minimum individual fitness of their target layer, and discards individuals that have been replaced in a layer by new entrants into that layer. Local candidate pool 312 is updated with the revised contents.

Sometime after the top layer of the local candidate pool 312 is full, candidate harvesting module 618 retrieves individuals for use in production. Candidate harvesting module 618 selects only from the top layer $L_T$ in the local candidate pool 312, and can apply further selection criteria as well in order to choose desirable individuals. For example, it can select only the fittest individuals from $L_T$, and/or only those individuals that have shown low volatility. Other criteria will be apparent to the reader. The individuals also typically undergo further validation as part of this further selection criteria, by testing on historical data not part of training data 114. The individuals selected by the candidate harvesting module 318 are written to the production population database 122 for use by production system 112 as previously described.

Note that because the evolutionary engines 330 are volunteer contributors to the system, they may go offline or lose communication with their up-chain units at any time. This may also be true of some mid-chain EC's 320 in some embodiments. Thus it is possible that some individuals that an EC 310 or 320 sent down-chain for further testing will never be returned to the sending EC. In this case the prior copy of the individual, retained by the EC, remains in place in its local candidate pool unless and until it is displaced through competition in the EC. Still further, note that an individual retained in an EC after it has also been sent to a down-chain unit for further testing, may become displaced and deleted from the EC through competition in the EC. In this case, if the same individual is returned by the down-chain unit, the EC simply ignores it.

In an evolutionary unit that enforces an elitist pool minimum fitness (typically all of the EC's 310 and 320 in the embodiment of FIG. 3), the step in which the fitness estimate of the current individual is compared to the minimum fitness of the target layer, can further include a test of whether the current individual's fitness estimate satisfies the elitist pool minimum fitness. Typically this latter test is applied only on individuals entering $L_1$ in the particular evolutionary unit, but as mentioned previously, could be applied to individuals being considered for other layers in the local candidate pool as well. If the current individual does not satisfy the elitist pool minimum fitness, then it is discarded.

Alife Individuals

Figure 7:
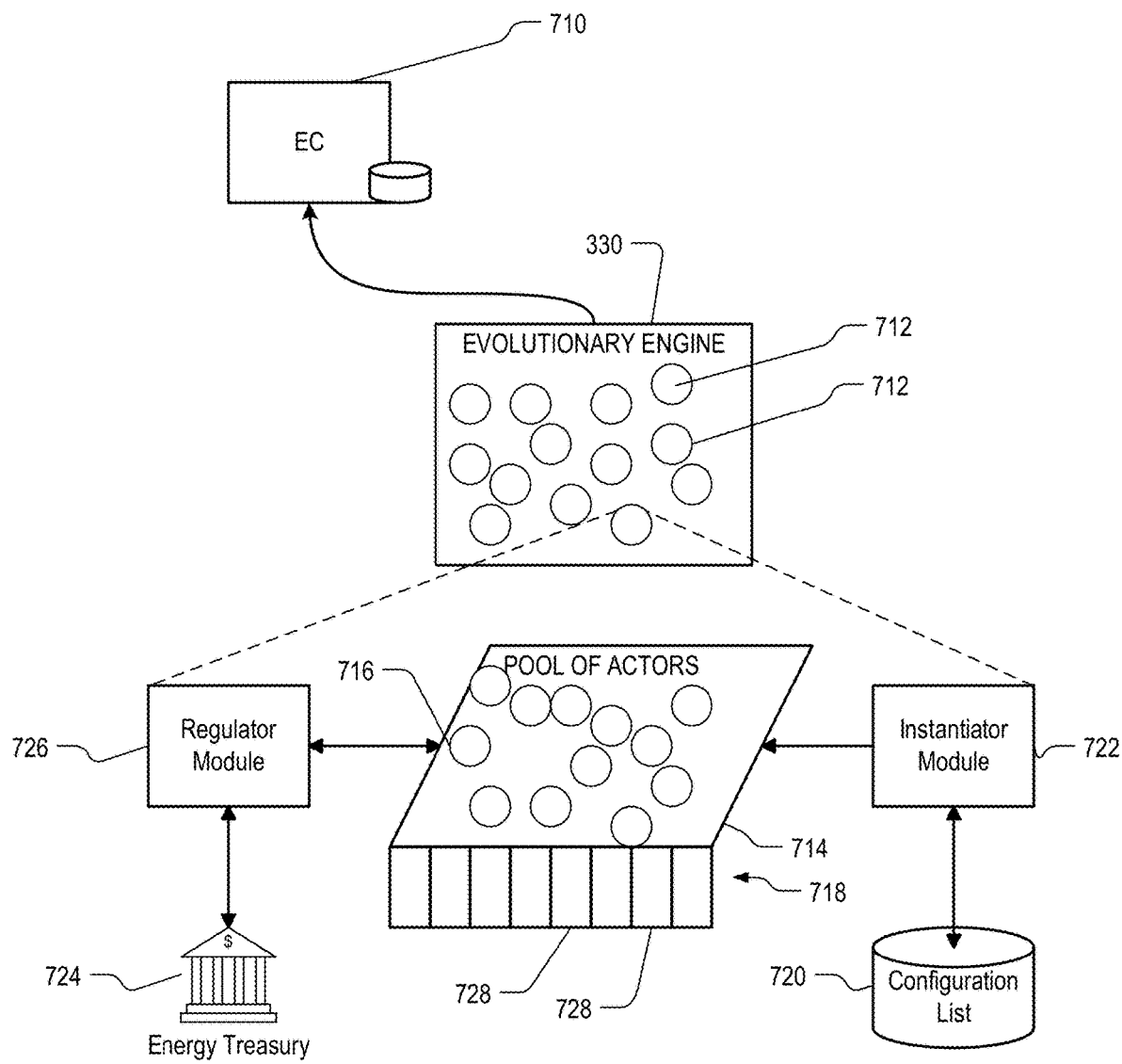
FIG. 7 is a detail drawing of a portion of the arrangement in FIG. 3.

FIG. 7 is a detailed drawing of the arrangement in FIG. 3, showing one representative of the evolutionary engines 330 and its immediately up-chain unit 710. The unit 710 may be a mid-chain EC 320 or the top-chain EC 310, and it will be understood that the evolutionary coordinator infrastructure may include further units further up-chain from EC 710 such as is shown in FIG. 3.

The EE 330 includes a pool of individuals 712. Significant components of one of the individuals 712 are shown in the expansion below EE 330. The various components act in concert as an ecosystem, and for that reason an "individual" is sometimes referred to herein as an "ecosystem". The ecosystem includes a pool 714 of "actors" 716, and a "geo" 718, both of which is described below. The ecosystem also includes a configuration list (also called a configuration database or file, though there is no requirement that it be housed in any particular file format) 720 and an instantiator module 722 which instantiates the actors 716 and other parts of the individual 712 when the individual is first activated (either upon initial creation or when training is about to begin or upon deployment in the production system 112). Instantiator module 722 instantiates the actors according to information in the individual's configuration list 720. Each of the actors 716 in the pool 714 has an associated "energy" level (not shown), and the ecosystem as a whole also has an energy level referred to herein as an energy treasury 724. A regulator module 726 iterates processing, evaluating and evolving of all the actors 716 at a sub-tick level. In one embodiment, all of the ecosystems in the candidate pool of an EE 330 exist and are processed on or by the EE 330. In another embodiment, some or all of the ecosystems can be distributed among one or more other computer systems.

Geo. Geo 718 is a vector of memory locations 728. In the embodiment of FIG. 7, each actor 718 is associated with one of the memory locations 728, and some of the actions asserted by the actors 718 allow them to move among the locations 728. More than one actor 718 can be associated with one location 728 in the geo 718 at any given time, and some locations 728 in the geo 718 can be associated with no actors 716 at any given time. The length of the geo 718 is one of the parameters in the individual's configuration list 720, and is evolvable during procreation of individuals by procreation module 416 (FIG. 4). The length can have any number of locations, and can be shorter or longer than the number of actors 716 in the ecosystem.

The geo has two primary functions: scratchpad memory and a communications interface by which the overall pool 714 of actors asserts the domain level actions of the overall individual 712 in response to events in the current data sample. Each geo location 728 has two elements in the embodiment of FIG. 7: one of the elements holds a scratchpad value which can be written to or read from by any associated actor 716, and the other element holds an action which can be written to or read from by any associated actor 716. Both elements can be thought of as scratchpad memory, but only the action element is visible outside the ecosystem and therefore only the action element can communicate an action to the outside world. Thus the geo provides a mechanism by which actors 716 can hold state, and also a mechanism by which actors 716 can communicate with each other. In other embodiments state and inter-actor communication can be implemented by other mechanisms. Also in other embodiments a geo location can have fewer or more elements than two.

Reading and writing of values into the geo occurs by way of the mini-actions (sometimes referred to herein as "actor actions") that can be asserted by the actors 716 at each sub-tick. The domain action (which can sometimes be NULL) to be asserted by the individual in response to the current event is taken from the action element of a fixed, pre-assigned one of the geo locations 728 at the end of all the processing cycles that the actors perform in response to the event. In one embodiment, this location is the center location of the geo 718. Before the next event is processed by the individual, in the embodiment of FIG. 7, the geo is shifted to the left (non-rotationally) by one location. This gives the actors 716 the ability to refer to recent past history of the ecosystem's activity in determining the actor-actions they will assert in the future. Another embodiment could use a different mechanism for retaining historical activity information and communicating it to the actors.

Actors. The actors 716 in an ecosystem's pool 714 of actors need not all be of the same type. In the embodiment of FIG. 7, actors can be of types RuleBasedActor, OnlineLearningActor, RandomActor, or ClairvoyantActor. The various types of actors differ from each other in their survival strategies. A RuleBasedActor is rule-based, similar to the rule-based individuals described in the above-incorporated DATA MINING TECHNIQUE WITH EXPERIENCE-LAYERED GENE POOL patent. Its genome for purposes of actor-level procreation is a set of rules, each of which has a conjunctively combined list of parameter/value pairs, and each of which asserts an action if the rule is true, the actions asserted by the rules being combined in some way to produce the action output of the actor at each actor level tick. The rules and/or their component values or parameter/value pairs are the units of procreation when the actors procreate. An OnlineLearningActor has a different kind of genome for procreation purposes. A RandomActor asserts actions in purely random sequence, and an individual made up of RandomActors can be used to determine a baseline performance for a given problem domain. A ClairvoyantActor is, unlike other types of actors, aware of some aspects of the domain and is used to set an upper bound on performance in the given problem domain. Other embodiments can support still further actor types, such as neural networks, or reinforcement learning actors such as Q-Learning actors. The availability of multiple actor types is believed to help the various actors in an ecosystem to specialize to address different aspects of the problem domain. The number of actors to instantiate, and their types, are parameters of the individual's configuration list 720, and are evolvable during procreation of individuals by procreation module 416 (FIG. 4). The number of actors of each type can vary during training or production, since actors can die off or can multiply by procreation internally to the ecosystem.

In addition to the genome, each actor 716 also has an associated energy level, an associated indicator/action set, and its associated location on the geo 718. As regards the actor's energy level, issuing actor level actions has a cost to the actor, which in the embodiment of FIG. 7 take the form of an energy transfer from the actor 716 to the ecosystem's energy treasury 724. These energy transfers are managed by the ecosystem's regulator module 726. An ecosystem starts with an overall energy value, which is an evolvable value in the individual's configuration list 720. The initial instantiation of the ecosystem includes assigning initial energy values to each actor that is created. The initial per-actor energy assignments, too, are evolvable values in the individual's configuration list 720. Actor level actions, including 'reproduce', have an energy cost associated to them (though the cost of asserting the actor level action 'eat' is negative, meaning energy is transferred from the ecosystem's energy treasury 724 to the actor 716). The cost of each action depends on the action, and also differs depending on the actor, with the difference expressed as an actor-level action cost multiplier which is an evolvable value in the ecosystem configuration list 720. On actor procreation, the action costs assigned to the offspring actors are derived from a combination of the action costs of the parents. Similarly, the starting energy levels of the offspring are transferred from the energy of the parents, such that net energy in the ecosystem is conserved.

As regards the indicator/action-set associated with an actor 716, the system has a universe of indicators and actor-level actions from which a subset is assigned to each of the actors in an ecosystem upon instantiation. The subset of indicators to be assigned to each actor is an evolvable list in the individual's configuration list 720. They are part of the ecosystem's genome which is subject to crossover and/or mutation during procreation at the level of individuals 712. Once assigned to an actor 716, however, each actor (or each of certain types of actors) is permitted to evolve its own subsets of indicators and actor-level actions. The subset of indicators assigned to an actor is the list of data elements that the actor can look at during its decision-making processes, and the list of actions assigned to the actor is the library of actions from which the actor can choose to assert in response to those indicators. These lists are part of the actor's genome which is subject to crossover and/or mutation during actor-level procreation. In another embodiment, the actor's initial list of indicators and actions instead can be learned from scratch by each actor at instantiation, using an online learning methodology.

In an embodiment, the universe of available actor actions includes one or more actions that are specific to the domain of the problem to be solved, plus the following "generic" actions which are not domain-specific:

Eat (i.e., transfer energy from the ecosystem's energy treasury 724 to the actor);
move left or right in the geo 718;
procreate;
write domain action into the action element of the actor's current location in the geo 718;
write a value (which in one embodiment is limited to 0 or 1) into the scratchpad element of the current location in the geo 718
give/take energy (allowing actors to exchange energy).

In an embodiment, the universe of available indicators includes all the domain-specific indictors provided in events of a data sample, plus the following "generic" indicators which are not domain-specific:

my current energy level;
my neighbor's energy level (other actor at same location 728 in the geo 718);
my current location 728 in the geo 718;
read action at current location in the geo 718;
is instruction pointer at this location;
read value written in scratchpad element of current location in the geo 718.

The configuration list 720 for an individual also includes various settings, such as those already mentioned above, as well as procreation parameters for the actors. Procreation parameters can include the interval (number of actor-level ticks) between actor-level procreation events, and the mutation rate to apply at each actor-level procreation event. In one embodiment, procreation parameters apply ecosystem-wide to all actors in the ecosystem, whereas in another embodiment they are specified on a per-actor basis. In the latter case, at procreation, one or a combination of the reproduction parameters of the parent actors is used to determine the reproduction process. In a third embodiment, some procreation parameters are ecosystem-wide and others are specified per-actor 716. Some or all of the procreation parameters form part of the genome of an actor and are subject to crossover and/or mutation during procreation at the level of actors. That is, actors have flexibility to control their own procreation parameters. Initial values for the settings are set forth in the configuration list 720, and they, too, are subject to crossover and/or mutation during procreation at the level of individuals.

The configuration list 720 for an individual also includes a starting location 728 for each actor 716 on the geo 718. These starting locations also form part of the genome of an individual and are subject to crossover and/or mutation during procreation at the level of individuals. In an embodiment, actor reproduction requires that both parents be in same location in the geo.

Regulator. The Regulator module 726 is responsible for processing and evaluating all actors 716 at the interval of "actor-level" of activity. Events occur at the interval of a "domain-level" cycles. For every event, the regulator performs a number N>1 loops (cycles) over every actor 716, updating the actors' states, updating energy levels, and managing any implications on the domain. N is a parameter specified in the configuration list 720 for the ecosystem. It forms part of the genome of the individual and is subject to crossover and/or mutation during procreation at the level of individuals. As an example, N may be on the order of 1000. At the end of N actor-level cycles of activity, the regulator module 726 the shifts the geo 718 to the left by one location. Thus the geo 718 contains prior and potential future commands, as many as its length allows.

At each actor-level cycle, each actor 716 may assert either an internal action or an external action. Internal actions are restricted to actions that have no external impact outside of the ecosystem, such as such as movement on the geo 718. External actions are domain actions, such as to write a command to the actor's current location 728 in the geo. Domain actions, if given effect at the end of the N actor-level cycles of activity, are actions that are visible (or effective) in the problem domain. "No Operation" (NOP) is considered in the embodiment of FIG. 7 to be a domain action.

The regulator module 726 is also responsible for mapping domain fitness changes to the ecosystem's overall fitness value. It is also responsible for mapping changes in domain fitness to individual actors, which it does through a corresponding change in the energy level of the ecosystem's energy treasury. In one embodiment the latter mapping is uniform among all existing actors 716 in the ecosystem. It is noted that "energy" as used herein, is merely a convenient term for a quantity by which performance pressure on an individual is translated to actors in the individual's ecosystem. Another embodiment can use a different term for this quantity.

The regulator module 726 is also responsible for tombstoning of actors that have run out of energy, since actors live only while they still have energy. The "tombstoning" of an actor has different meanings in different embodiments. In one embodiment, "tombstoning" of an actor means removing it from the ecosystem. In another embodiment, "tombstoning" of an actor means marking it as no longer available for procreation or for issuance of actor-level actions, though the actor remains present for historical, analytic, or other purposes.

The regulator module 726 is also responsible for applying a cost to different actors 716 as they live in the ecosystem. In one embodiment, the regulator module 726 associates a cost to different actions, or to lack of an action, at each actor-level cycle. A simple novelty mechanism can be implemented to ensure diversity of behavior across the actors 716 in the ecosystem. The regulator module 726 is also responsible for actor procreation, including holding procreation events at specified intervals of the actor-level cycle, thereby allowing the introduction of new actors into an ecosystem.

Configuration list. As previously mentioned, each ecosystem also has a configuration list 720 which specifies evolvable parameters and values for the individual, and for all initial actors 716 upon instantiation. Many of the parameters that can be included in the configuration list 720 in various embodiments are set forth above, but for convenience some of them are collected here as well. In various embodiments they can include:

an eAction-set, which is an evolvable subset of the universe of actions available to the ecosystem for assigning to the actors 716 upon instantiation;
an eIndicator-set, which is a evolvable subset of the universe of indicators available to the ecosystem for assigning to the actors 716 upon instantiation;
eSettings, which is an evolvable vector of scalars used as the initial configuration for an ecosystem at start-up. These may include:
initial number and initial configuration of actors;
number of actor-level cycles per domain cycle (event), i.e. the value of N above;

Initial actor energy levels and energy levels at instantiation
Actor maturity age
Ecosystem-wide reproduction/mutation settings
Action costs
geo size Energy Treasury. The total initial energy level of an ecosystem is fixed and constant for all individuals 712 in EE 330, though the amount in the energy treasury 724 can vary during operation. If the amount of energy in the energy treasury 724 falls to some predetermined minimum (such as zero), the individual is tombstoned.

System Operation

The operation of Training System 110 (FIG. 1) is described above at the level of individuals being evolved in an EE 330. As mentioned, candidate testing module 412 tests the population of individuals in the EE's local candidate pool 332 on training data 114, and evolution of the individual's actors occurs during the training. Also as previously mentioned individuals are inserted into the local candidate pool 332 either by local pool initialization module 410, or by candidate insertion module 422, or by procreation module 416. Local pool initialization module 410 creates initial sets of candidate individuals in L0 of the candidate pool 332. Creation of a new individual involves creation of a configuration list 720 for the individual, which can be done randomly or by any of a number of other mechanisms. These individuals have never been tested, so they have no history. Their current state is the same as the state in which they were created. Candidate insertion module 422 inserts individuals into the local candidate pool 332 whose testing has been delegated to the EE 330 by an up-chain EC. These individuals are defined by respective configuration lists 722, plus a "current state" that had been developed through prior batteries of testing. Thus to fully characterize these individuals, either the current state of the individual is stored along with its configuration list (in which case the current state can simply be applied to the individual in order to bring it current), or the history of data samples on which the individual has been tested is stored (in which case the current state can be re-instated by re-training the individual on the entire history of data samples). Procreation module 416 inserts individuals into the local candidate pool 332 which were formed by crossover and/or mutation from one or more parent individuals. Like those individuals inserted by local pool initialization module 410, individuals inserted by procreation module 416 have a current state which is the same as the state in which they were created. No training history need be known in order to bring them into a "current state".

Figure 8:
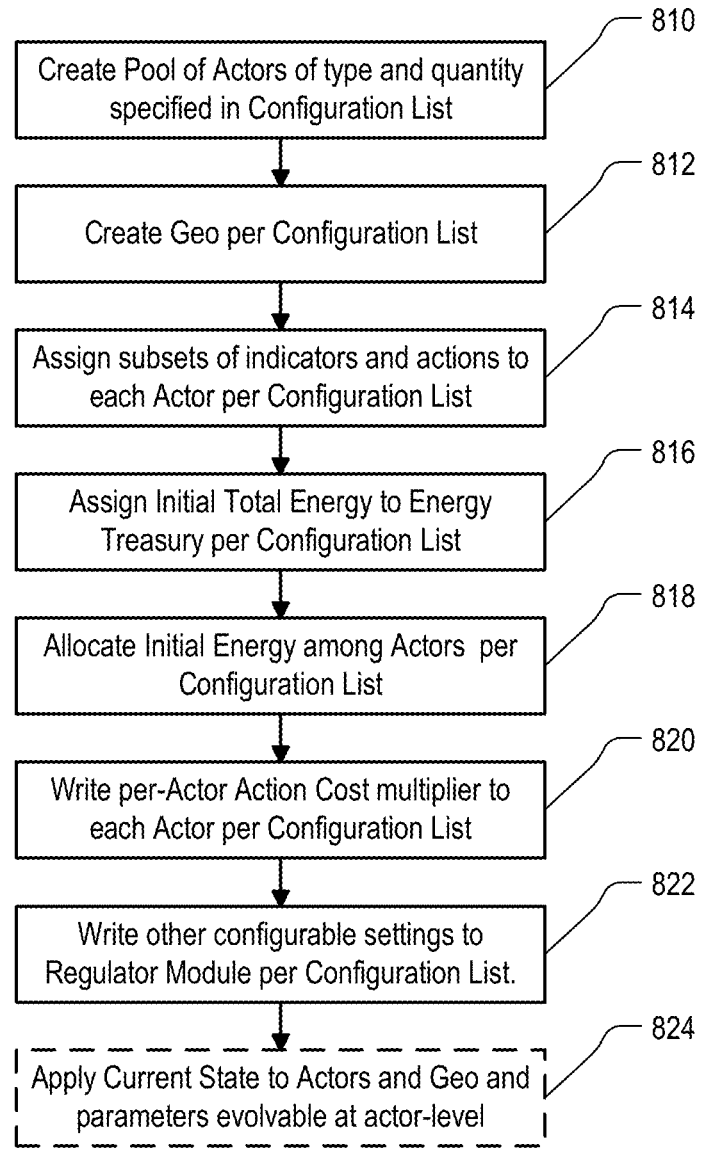
FIG. 8 is a flow chart illustrating steps performed in order to instantiate an individual.

In all three cases, before a newly inserted individual can undergo training by candidate testing module 412, the individual is instantiated. FIG. 8 is a flow chart illustrating steps performed in order to instantiate an individual. As with all flow charts herein, FIG. 8 illustrates logic for accomplishing a goal. The logic can be implemented using processors programmed using computer programs stored in memory accessible to the computer systems and executable by the processors, by dedicated logic hardware, including field programmable integrated circuits, or by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

Referring to FIG. 8, in step 810, the training system 110 creates a pool 714 of actors 716 for the individual. The types and quantities of actors of actors are specified in configuration list 720. In step 812, the system creates a geo 718 for the individual. Parameters for the geo are indicated in the configuration list 720. In step 814, the system assigns subsets of indicators and actions to each actor 716 as indicated in the configuration list 720. In step 816, the system assigns an initial total energy to the energy treasury 724 for the individual per the configuration list 720. In step 818, the system allocates initial energy levels to the actors 716 per the configuration list 720. In step 820, the system marks each actor 716 with its per-actor action cost multiplier, as indicated in the configuration list 720. In step 822, other configurable settings are written to the regulator module 726 of the individual, per the configuration list 720. These can include for example the value of N (number of actor-level cycles per domain-level event), and ecosystem-wide procreation/mutation settings. In step 824, if the state of the actors needs to be brought to current, the system either applies a provided current state to the actors 716 and the geo 718, or re-trains the individual on the complete history of training data. The individual is now ready to undergo testing by the candidate testing module 412.

Figure 9:
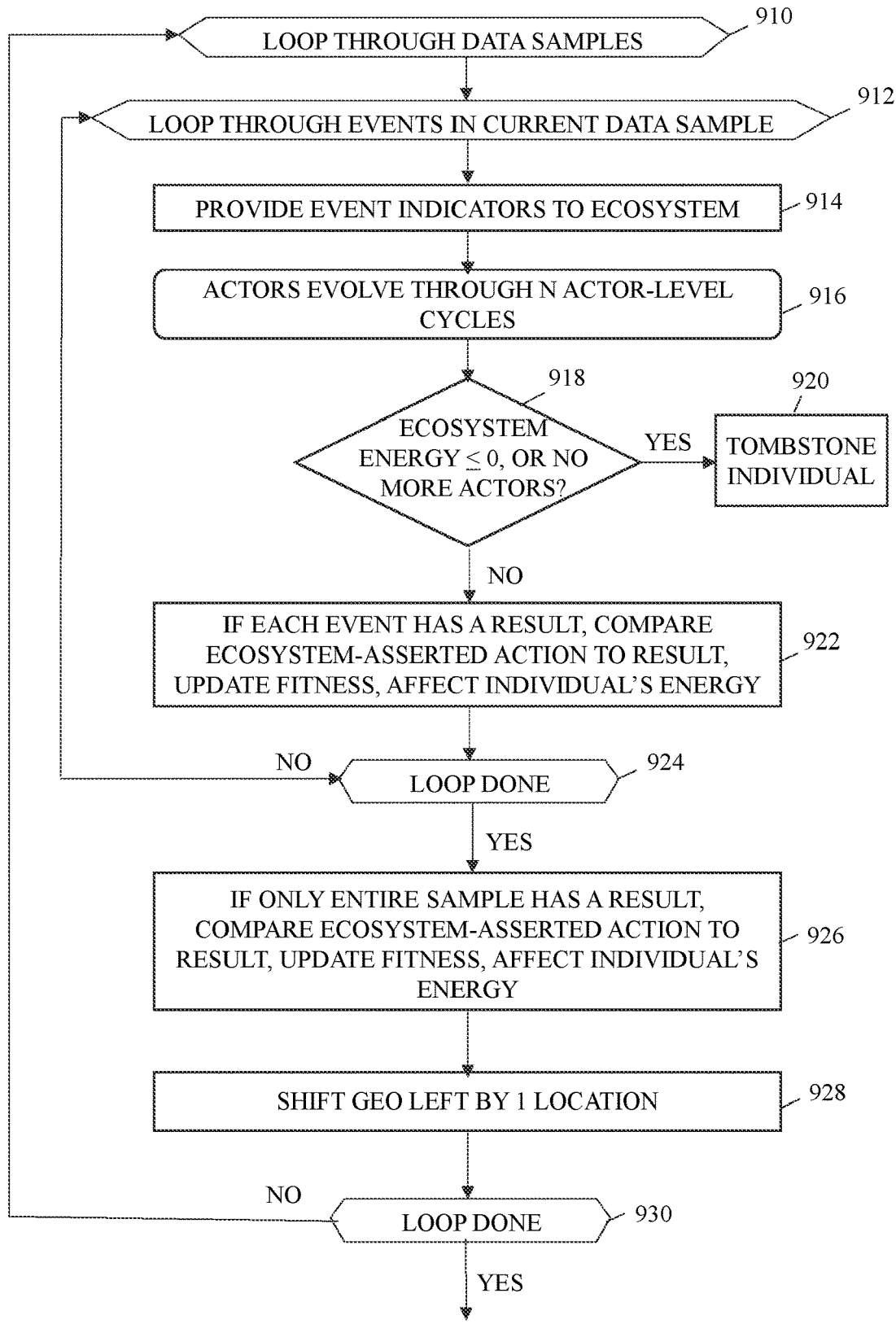
FIG. 9 is a flow chart of steps performed by the candidate testing module in FIG. 4 in training a particular individual on a training battery of data samples.

FIG. 9 is a flow chart of steps performed by candidate testing module 412 in training a particular individual on a training battery of data samples. In step 910 the system begins a loop through the data samples in the training battery. In step 912, the system begins another loop, nested within loop 910, through the events in the current data sample. In step 914, the system provides the indicators from the current event to the ecosystem. These indicators are now available to the actors 716 to see. In step 916 the system evolves the actors in the ecosystem through the previously specified number N actor-level cycles of activity. A detail of step 916 is provided in FIG. 10. After the N actor-level cycles, the system determines in step 918 whether the individual should be tombstoned. This can occur either if the ecosystem's energy treasury has fallen to some predetermined minimum (such as zero), or if all of the ecosystem's actors have been tombstoned within step 916. If so, then in step 920 the individual is tombstoned and the testing of the individual ceases.

If the individual is not tombstoned, then in step 922, if the domain is such that each event in a sample has a corresponding result, then the system compares the ecosystem-asserted action to the result of the current event. Fitness of the individual is updated accordingly, and the individual's energy treasury is updated as well. In step 924 the system determines whether the current data sample has more events, and if so, returns to step 912 to process the next event.

If there are no more events in the current data sample, then in step 926, if the domain is such that only the entire sample has a result, the system at this time compares the ecosystem-asserted action to the result of the current sample. Fitness of the individual is updated accordingly, and the individual's energy treasury is updated as well. In step 928 the individual's geo is shifted left by one location. In step 930 the system determines whether the battery of tests includes more data samples, and if so, returns to step 910 to process the next data sample.

It is noteworthy that fitness is applied at the level of the individual, rather than at the level of the actors. Changes to an individual's fitness affect the actors only indirectly in the embodiment of FIG. 7. In particular, changes to the individual's fitness level are mapped to a change in the ecosystem treasury's total energy, and that energy, available to the actors by way of their "eat" action, either increases or decreases the actors' likelihood of survival. In another embodiment, more specific fitness attribution mechanisms are implemented. For example, a change in individual fitness (positive or negative) can be wholly or mostly allocated to the actor or actors directly responsible for issuing the domain actions that resulted in the change in the individual's fitness. Also, in an embodiment, the energy in the ecosystem treasury is reduced at every event. In another embodiment, this reduction is made on events in which no domain action is issued by the individual.

Figure 10:
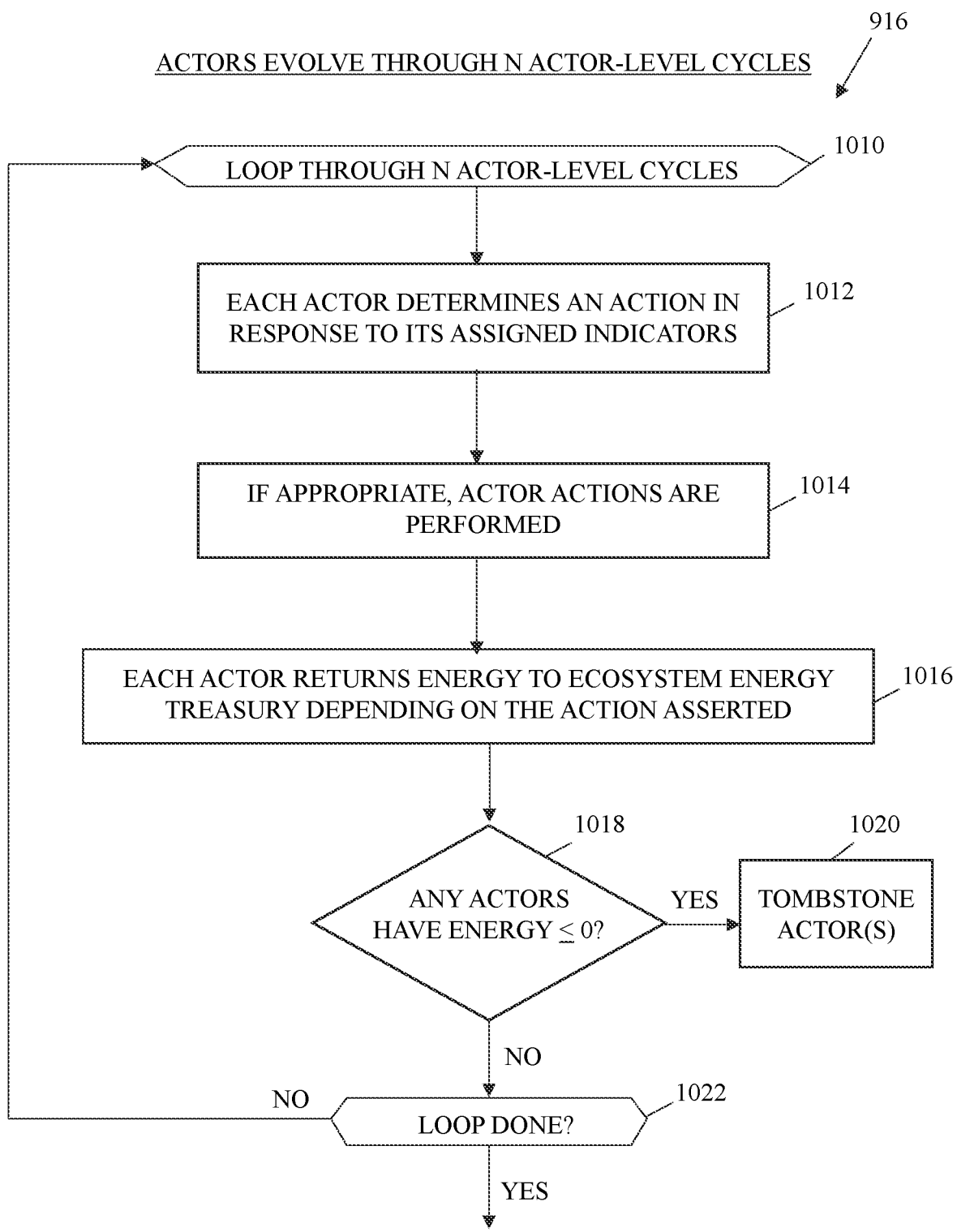
FIG. 10 is a flow chart detail of the step in FIG. 9 in which actors evolve through N actor-level cycles of activity.

FIG. 10 is a flow chart detail of step 916 (FIG. 9) in which actors evolve through N actor-level cycles. In step 1010, the candidate testing module 412 begins a loop through N actor-level cycles of activity. This loop is nested inside loop 912 (FIG. 9). In step 1012, each actor determines an action in response to the actor's then-currently assigned indicators. (In some cases the action is a NOP). In one embodiment step 1012 is performed using a still further nested loop, considering all the then-present actors in a fixed sequence. If the action involves doing something, such as writing to the geo 718, or procreation, then in step 1014 the appropriate action is performed. In step 1016, each actor returns energy to the ecosystem energy treasury 724 depending on the action asserted and the current configuration of the actor. (If the action is to 'eat', then energy is transferred in the opposite direction, from the energy treasury 724 to the actor.) In step 1018, if any actors have now expended all their energy, then those actors are tombstoned in step 1020. In step 1022 the system determines whether all N actor-level cycles have been completed. If not, then the system returns to step 1010 for the next cycle. If so, then the candidate testing module 412 continues with step 918 (FIG. 9).

Figure 11:
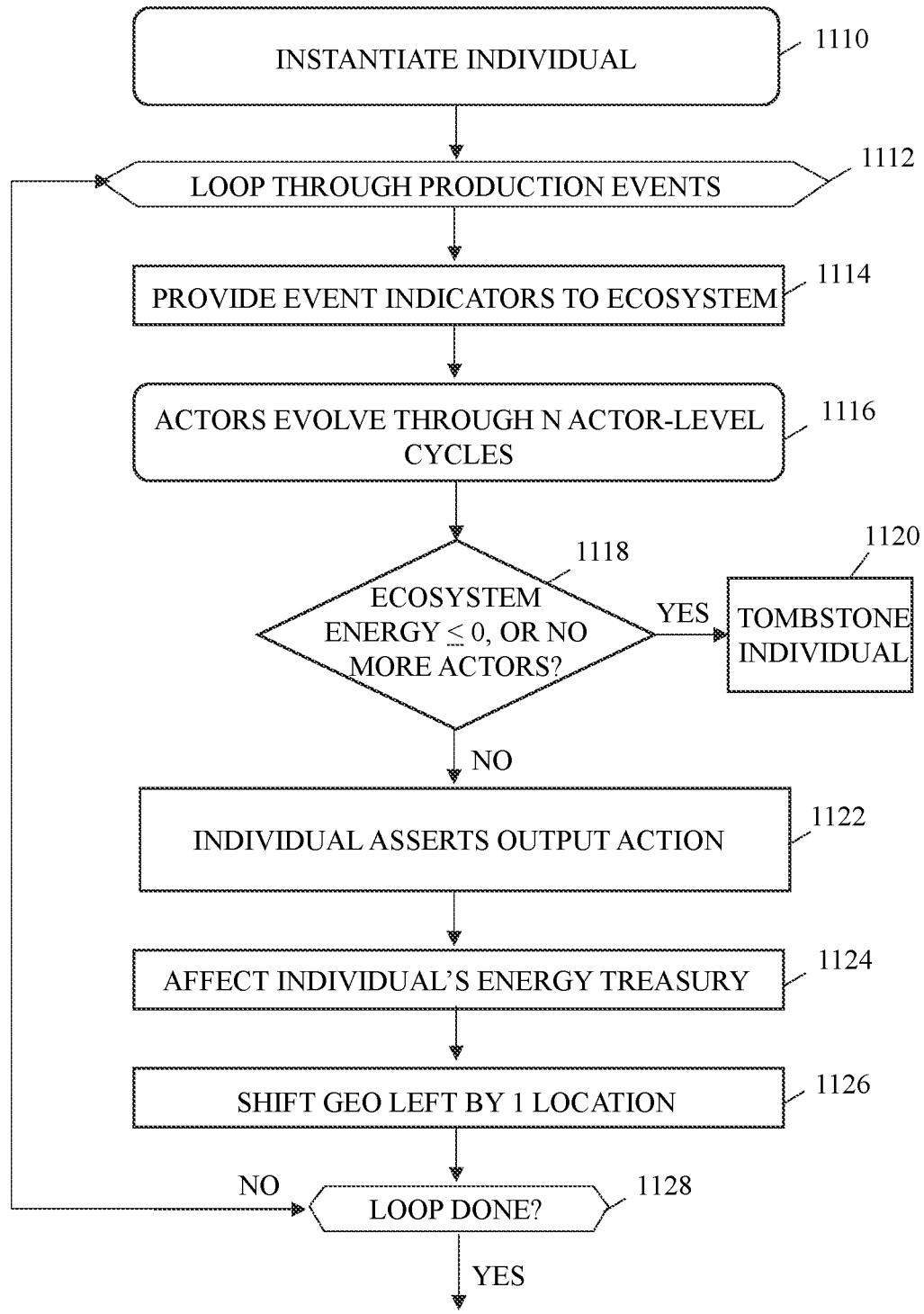
FIG. 11 is a flow chart of steps performed in the operation of the Production System in FIG. 1.

The operation of Production System 112 (FIG. 1) with respect to a deployed individual now in the production population 122 is now described with reference to FIG. 11. In step 1110, the individual is first instantiated. The same steps used to instantiate an individual in the training system 110, described in FIG. 8, can be used for this purpose in the production system 112 as well. In step 1112, the production system 112 begins a loop through the production events. In step 1114, the system provides the indicators from the current event to the individual's ecosystem. These indicators are now available to the actors 716 to see. In step 1116 the system evolves the actors in the ecosystem through the previously specified number N of actor-level cycles. The same steps used to evolve an individual through N actor-level cycles in the training system 110, described in FIG. 10, can be used for this purpose in the production system 112 as well. This includes the steps 1018 and 1020 for tombstoning actors whose energy level has fallen to some predetermined minimum (such as zero). After the N actor-level cycles of activity, the system determines in step 1118 whether the individual should be tombstoned. As during training, this can occur either if the ecosystem's energy treasury has fallen to some predetermined minimum (such as zero), or if all of the ecosystem's actors have been tombstoned within step 1116. If so, then in step 1120 the individual is tombstoned and the production run ceases, at least with respect to the subject individual.

If the individual is not tombstoned, then in step 1122, if the domain is such that individuals assert actions in response to each event in a sample, then this occurs in step 1122. Fitness of the individual is updated accordingly, and the individual's energy treasury is updated as well in step 1124, both the same as during training. In step 1126 the individual's geo is shifted left by one location, again to mimic its conditions during training. In step 1128, if there are more production events, then the production system 112 returns to step 1112 to process the next event.

It can be seen that even during production operation, the actors 716 of an individual continue to evolve and adapt to events, even though the configuration list of the individual is now fixed. Actor evolution is restricted because of several features of the individual's configuration list, such as the lists of available indicators and actions that can be added to a newly created actor during actor procreation, and the procreation parameters themselves, and these features may be different for different individuals. Thus the actors of an individual can adapt during production operation, but only within the now-fixed outlines established by the individual's evolved configuration list.

It can also be seen that actors and indeed entire individuals can have their energy levels depleted and therefore die out, just as they can during training. During training, this means the ecosystem was not good enough, even with the flexibility to evolve its actors, to successfully navigate the training data. During production, this may mean that the production data are different in some significant way, a way that might not even easily be apparent to a human, that the ecosystem, even with the flexibility to continue evolving its actors, is not able to adapt. Thus the continued pressure exerted by the energy regime during production, acts as a check on individuals to ensure they have not been placed into an environment which is "outside of their league".

Computer Hardware

Figure 12:
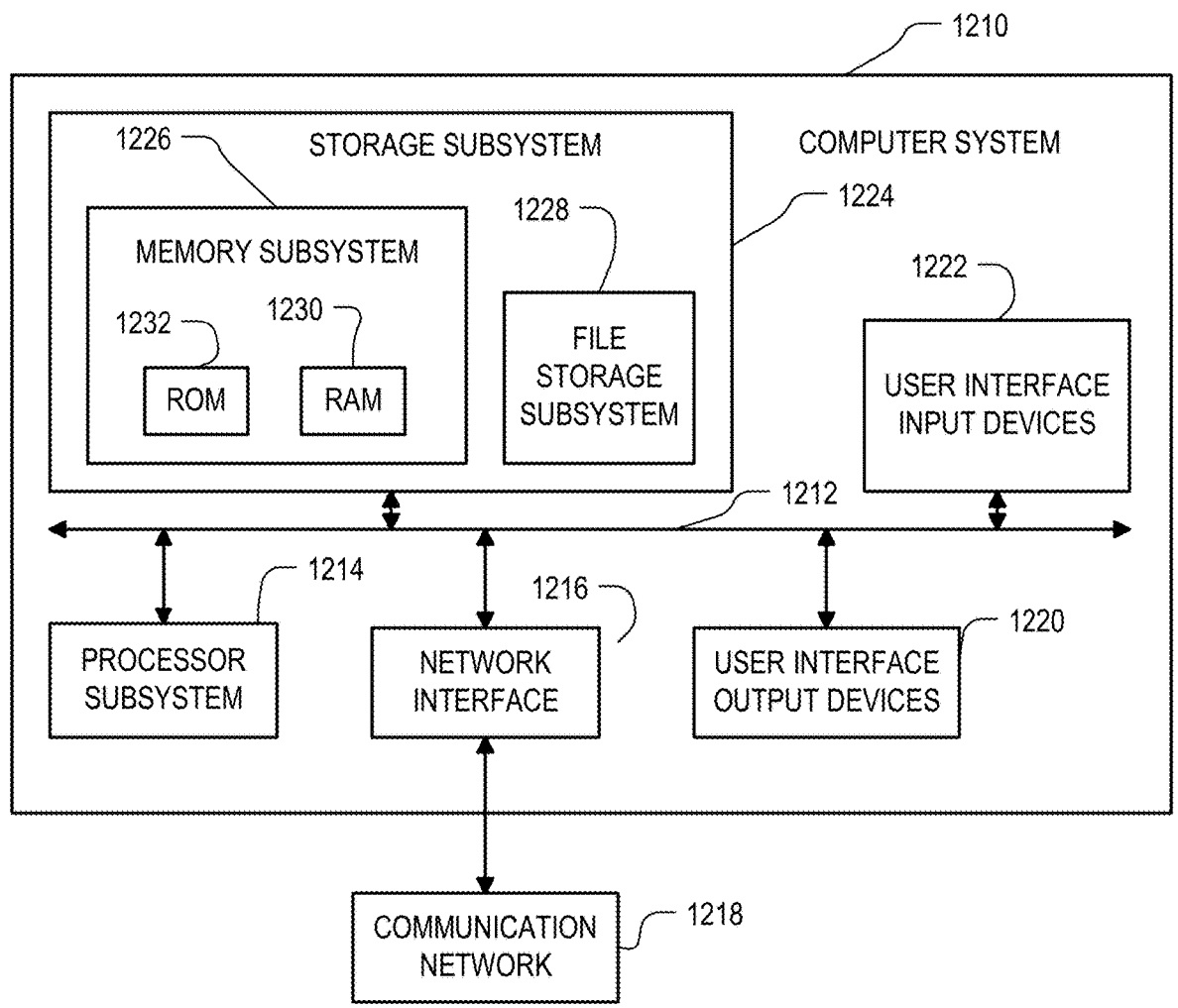
FIG. 12 is a simplified block diagram of a computer system that can be used to implement any or all of the evolutionary units, the production system, and the data feed server in FIGS. 1 and 3.

FIG. 12 is a simplified block diagram of a computer system 1210 that can be used to implement any or all of the evolutionary units 310, 320, 330 and 710, the production system 112, and the data feed server 340. While the drawings indicate individual components for carrying out specified operations, it will be appreciated that each component actually causes a computer system such as 1210 to operate in the specified manner.

Computer system 1210 typically includes a processor subsystem 1214 which communicates with a number of peripheral devices via bus subsystem 1212. These peripheral devices may include a storage subsystem 1224, comprising a memory subsystem 1226 and a file storage subsystem 1228, user interface input devices 1222, user interface output devices 1220, and a network interface subsystem 1216. The input and output devices allow user interaction with computer system 1210. Network interface subsystem 1216 provides an interface to outside networks, including an interface to communication network 1218, and is coupled via communication network 1218 to corresponding interface devices in other computer systems. For the evolutionary units 310, 320 and 330, communication with the unit's up-chain and down-chain units occurs via communication network 1218. Communication network 1218 may comprise many interconnected computer systems and communication links. These communication links may be wireline links, optical links, wireless links, or any other mechanisms for communication of information. While in one embodiment, communication network 1218 is the Internet, in other embodiments, communication network 1218 may be any suitable computer network or combination of computer networks.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1210 or onto computer network 1218.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1210 to the user or to another machine or computer system. In particular, an output device of the computer system 1210 on which production system 112 is implemented, may include a visual output informing a user of action recommendations made by the system, or may include a communication device for communicating action signals directly to the controlled system 128. Additionally or alternatively, the communication network 1218 may communicate action signals to the controlled system 128. In the financial asset trading environment, for example, the communication network 1218 transmits trading signals to a computer system in a brokerage house which attempts to execute the indicated trades.

Storage subsystem 1224 stores the basic programming and data constructs that provide the functionality of certain embodiments of the present invention. For example, the various modules implementing the functionality of certain embodiments of the invention may be stored in storage subsystem 1224. These software modules are generally executed by processor subsystem 1214. Storage subsystem 1224 also stores the candidate pools 312, 322 or 332, as the case may be, for a respective evolutionary unit. For the data feed 340 storage subsystem 1224 may store the training database 114. For the top-chain EC 310 and/or for production system 112, storage subsystem 1224 may store the production population 122. Alternatively, one or more of such databases can be physically located elsewhere, and made accessible to the computer system 1210 via the communication network 1218.

Memory subsystem 1226 typically includes a number of memories including a main random access memory (RAM) 1230 for storage of instructions and data during program execution and a read only memory (ROM) 1232 in which fixed instructions are stored. File storage subsystem 1228 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1228. The host memory 1226 contains, among other things, computer instructions which, when executed by the processor subsystem 1214, cause the computer system to operate or perform functions as described herein. As used herein, processes and software that are said to run in or on "the host" or "the computer", execute on the processor subsystem 1214 in response to computer instructions and data in the host memory subsystem 1226 including any other local or remote storage for such instructions and data.

As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Bus subsystem 1212 provides a mechanism for letting the various components and subsystems of computer system 1210 communicate with each other as intended. Although bus subsystem 1212 is shown schematically as a single bus, alternative embodiments of the bus subsystem may use multiple busses.

Computer system 1210 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1210 depicted in FIG. 12 is intended only as a specific example for purposes of illustrating the preferred embodiments of the present invention. Many other configurations of computer system 1210 are possible having more or fewer components than the computer system depicted in FIG. 12. In an embodiment, software code portions for performing any of the functions described herein can be stored at one location, and then retrieved and transmitted to the location of a computer system that will be executing them. The transmission may take the form of writing the code portions onto a non-transitory computer readable medium and physically delivering the medium to the target computer system, or it may take the form of transmitting the code portions electronically, such as via the Internet, toward the target computer system. As used herein, electronic transmission "toward" a target computer system is complete when the transmission leaves the source properly addressed to the target computer system.

The claims describe aspects of various examples of methods relating to the invention. In addition, the following clauses set forth various examples of further variations and aspects relating to the invention.

Whereas the claims are expressed as systems, aspects of the invention also can be described as a method performing the functions set forth as being performed by the system in claim 1, a method performing the functions set forth as being performed by the system in claim 2, and so on for claims 3, 4, 5, 6, 7, 8, 9, 10 and 11.

Aspects of the invention include a computer readable medium having stored thereon in a non-transitory manner, a plurality of software code portions defining logic for performing the functions set forth as being performed by the system in claim 1, logic for performing the functions set forth as being performed by the system in claim 2, and so on for claims 3, 4, 5, 6, 7, 8, 9, 10 and 11.

Aspects of the invention include a method comprising retrieving software code portions defining logic for performing the functions set forth as being performed by the system in claim 1, and transmitting the software code portions toward an evolutionary engine for execution. Aspects of the invention also include such a method with respect to logic for performing the functions set forth as being performed by the system in claim 2, and so on for claims 3, 4, 5, 6, 7, 8, 9, 10 and 11.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A computer-implemented data mining system, for use with a data mining training database containing samples of training data, each of the samples having at least one data entry, comprising:

a training system including at least one evolutionary unit with an associated processor subsystem having stored accessibly thereto a candidate database having a pool of candidate individuals, each candidate individual having a respective pool of actors and a respective set of parameters which influence evolution of the actors in the respective pool of actors, the at least one evolutionary unit with associated processor subsystem, for each given one of at least a subset of the candidate individuals:

evolving the parameters of the given candidate individual in dependence upon the samples of training data, and evolving each of the actors of the given candidate individual in dependence upon the samples of training data and further in dependence upon the parameters of the given candidate individual; and a production system including an associated processor subsystem having stored accessibly thereto a production population database of deployable individuals selected from the candidate individuals wherein each of the deployable individuals includes a fixed set of evolved parameters:

deploying a deployable individual from the production population database to assert actions in dependence upon production data, the actions asserted by the deployable individual being dependent on a response of the actors of the deployable individual to the production data, and an evolutionary engine for further evolving the actors of the deployable individual after deployment in dependence upon the fixed set of evolved parameters of the given individual and the production data.

2. A computer-implemented data mining system, for use with a data mining training database containing a plurality of training samples, each of the training samples having a set of at least one data entry, comprising:

a memory storing a candidate database having a pool of candidate individuals, each candidate individual in at least a non-null subset of the candidate individuals having a respective pool of actors and a respective set of parameters which influence evolution of actors in the respective pool of actors, each candidate individual further having associated therewith an indication of a respective fitness estimate;

a candidate pool processor which:

evolves the set of parameters of each individual in dependence upon the training samples;

applies the training samples to individuals from the candidate pool, each individual being tested processing its actors through N>1 actor-level cycles of activity in response to each of the data entries, the actors of the individual collaborating to assert an action for the individual in response to the data entry, and updates the fitness estimate associated with each of the individuals being tested in dependence upon both the training data and actions asserted by the respective individual in a battery of trials;

a competition processor including an associated processor subsystem which selects individuals for discarding from the candidate pool in dependence upon predefined criteria;
a candidate harvesting processor including an associated processor subsystem providing for deployment of selected ones of the individuals from the candidate pool;
a production system that deploys selected ones of the individuals from the candidate pool to assert actions in dependence upon production data, the actions asserted by the deployed individual being dependent on a response of the actors of the deployed individual, wherein each of the deployed individuals includes a fixed set of evolved parameters;
an evolutionary engine for further evolving the actors of the deployed individual after deployment in dependence upon the fixed set of evolved parameters of the given individual and the production data.

3. The system of claim 2, wherein, applying the training samples to a particular one of the individuals:
each of the actors of the particular individual asserts an actor-level action at each of the actor-level cycles in response to the training data; and
the action asserted for the individual in response to the data entry is responsive to the actor-level actions asserted by the actors at the actor-level cycles.

4. The system of claim 3, wherein each of the individuals has associated therewith a respective library of actor-level actions that are available to each of the individual's actors for assertion during the actor-level cycles,
wherein each of the individuals has associated therewith a respective library of indicators in response to which the individual's actors can select an actor-level action to assert during the actor-level cycles,
one of the individuals in the candidate pool differs from a second one of the individuals in the candidate pool in their respective libraries of actor-level actions and/or indicators.

5. The system of claim 4, further comprising a procreation processor including an associated processor subsystem which evolves new individuals for the candidate pool at least in part by crossover and/or mutation of the indicators and actor-level actions in the libraries of parent ones of the new individuals.

6. The system of claim 3, wherein the actor-level actions are selected by each of the actors of the particular individual from a library of available actor-level actions,
wherein one of the available actor-level actions comprises asserting a signal readable by actors of the particular individual,
and wherein one of the actors of the particular individual asserts an actor-level action in response to signals asserted by other actors of the particular individual.

7. The system of claim 2, wherein the actors of the individual collaborating to assert an action for the individual in response to the data entry includes the actors of the individual communicating among themselves in response to the data entry in one of the actor-level cycles.

8. The system of claim 2, wherein each of the individuals in the subset of candidate individuals further has associated therewith an energy treasury for the individual as a whole,
wherein each of the actors in the pool of actors for the individual has associated therewith an energy level which affects the actor's ability to survive,
and wherein the candidate pool processor further:
changes the energy treasury of each of the individuals being tested in dependence upon changes to the fitness estimate of the individual; and
allocates the changes in the energy treasury among one or more of the actors of the respective individual.

9. The system of claim 8,
wherein each of the actors of the particular individual asserts an actor-level action at each of the actor-level cycles in response to the training data,
wherein the actor-level actions are selected by each of the actors of the particular individual from a library of available actor-level actions,
and wherein allocating the changes in the energy treasury among one or more of the actors of the respective individual comprises assertion by the actor of an actor-level action which entails an energy cost to the actor,
and wherein the candidate pool processor tombstones actors whose energy level falls below a predetermined minimum.

10. The system of claim 9, wherein allocating the changes in the energy treasury among one or more of the actors of the respective individual further comprises assertion by the actor of an action which transfers energy from the individual's energy treasury to the actor.

11. A computer-implemented data mining process, for use with a database of deployable individuals, each of the deployable individuals having a respective pool of actors and a respective fixed set of evolved parameters which influence evolution of the actors in the respective pool of actors, the fixed set of evolved parameters of each individual having been evolved based on training data, the process comprising:
deploying one of the individuals from the database of deployable individuals to assert actions in dependence upon production data, the actions asserted by the deployable individual being dependent on a response of the actors of the deployable individual to the production data, and
further evolving by an evolutionary engine the actors of the deployable individual after deployment in dependence upon the fixed set of evolved parameters of the given individual and the production data.

* * * * *